(12) United States Patent
Makino et al.

(10) Patent No.: US 10,892,516 B2
(45) Date of Patent: Jan. 12, 2021

(54) ALL-SOLID STATE SECONDARY BATTERY, PARTICLES FOR ALL-SOLID STATE SECONDARY BATTERY, SOLID ELECTROLYTE COMPOSITION FOR ALL-SOLID STATE SECONDARY BATTERY, AND ELECTRODE SHEET FOR ALL-SOLID STATE SECONDARY BATTERY, AND METHODS FOR MANUFACTURING SAME

(71) Applicant: FUJIFILM Corporation, Tokyo (JP)

(72) Inventors: Masaomi Makino, Kanagawa (JP); Hiroaki Mochizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 222 days.

(21) Appl. No.: 16/002,204

(22) Filed: Jun. 7, 2018

(65) Prior Publication Data

US 2018/0287206 A1    Oct. 4, 2018

Related U.S. Application Data

(63) Continuation of application No. PCT/JP2016/088573, filed on Dec. 22, 2016.

(30) Foreign Application Priority Data

Dec. 25, 2015 (JP) ................... 2015-255357

(51) Int. Cl.
*H01M 10/0562* (2010.01)
*H01M 4/133* (2010.01)
(Continued)

(52) U.S. Cl.
CPC ......... *H01M 10/0562* (2013.01); *H01M 4/13* (2013.01); *H01M 4/133* (2013.01);
(Continued)

(58) Field of Classification Search
CPC ............ H01M 10/0562; H01M 4/587; H01M 4/1393; H01M 4/133
See application file for complete search history.

(56) References Cited

U.S. PATENT DOCUMENTS 8,709,106 B2 * 4/2014 Ota ................. H01M 4/134
29/623.5
9,859,560 B2 * 1/2018 Holme ............. H01M 10/052
(Continued)

FOREIGN PATENT DOCUMENTS

CN    102187500 A    9/2011
CN    104106164 A    10/2014
(Continued)

OTHER PUBLICATIONS

Communication dated Jul. 2, 2019, from the Japanese Patent Office in counterpart application No. 2017-558312.
(Continued)

*Primary Examiner* — Jonathan G Jelsma
(74) *Attorney, Agent, or Firm* — Sughrue Mion, PLLC

(57) ABSTRACT

Provided are all-solid state secondary battery containing sulfide-based inorganic solid electrolyte particles having conductivity for ions of metals belonging to Group I or II of the periodic table and non-oxide-based electrode active material particles, in which a proportion of an oxygen element in an element composition of a surface of at least one kind of the sulfide-based inorganic solid electrolyte particles or the non-oxide-based electrode active material particles is 3.0 atm % or more, particles for an all-solid state secondary battery, a solid electrolyte composition for an all-solid state secondary battery, an electrode sheet for an all-solid state secondary battery, and an all-solid state sec-
(Continued)

ondary battery for which the particles for an all-solid state secondary battery are used, and methods for manufacturing the same.

18 Claims, 1 Drawing Sheet

(51) Int. Cl.
| | |
|---|---|
| *H01M 4/587* | (2010.01) |
| *H01M 4/13* | (2010.01) |
| *H01M 4/139* | (2010.01) |
| *H01M 10/058* | (2010.01) |
| *H01M 4/62* | (2006.01) |
| *H01M 10/052* | (2010.01) |
| *H01M 10/054* | (2010.01) |
| *H01M 4/1393* | (2010.01) |
| *H01M 10/0525* | (2010.01) |
| *H01M 10/0585* | (2010.01) |

(52) U.S. Cl.
CPC ......... *H01M 4/139* (2013.01); *H01M 4/1393* (2013.01); *H01M 4/587* (2013.01); *H01M 4/62* (2013.01); *H01M 4/625* (2013.01); *H01M 10/052* (2013.01); *H01M 10/054* (2013.01); *H01M 10/058* (2013.01); *H01M 10/0525* (2013.01); *H01M 10/0585* (2013.01); *H01M 2300/0068* (2013.01)

(56) References Cited

U.S. PATENT DOCUMENTS

| | | | |
|---|---|---|---|
| 2012/0225351 | A1 | 9/2012 | Kojima |
| 2013/0309580 | A1* | 11/2013 | Tomura ................. H01M 4/131 429/304 |
| 2014/0342209 | A1* | 11/2014 | He ..................... H01M 10/056 429/101 |
| 2014/0377627 | A1 | 12/2014 | Furuya et al. |
| 2015/0357644 | A1 | 12/2015 | Holme et al. |
| 2016/0204468 | A1* | 7/2016 | Makino ................. C08G 69/40 429/310 |
| 2017/0237114 | A1 | 8/2017 | Makino et al. |

FOREIGN PATENT DOCUMENTS

| | | |
|---|---|---|
| JP | 07-105938 A | 4/1995 |
| JP | 2001-015153 A | 1/2001 |
| JP | 2004-039443 A | 2/2004 |
| JP | 2012-039443 A | 2/2004 |
| JP | 2005-317447 A | 11/2005 |
| JP | 2008-198536 A | 8/2008 |
| JP | 2012-094445 A | 5/2012 |
| JP | 2014-112485 A | 6/2014 |
| JP | 2015-153628 A | 8/2015 |
| JP | 2015-191865 A | 11/2015 |
| WO | 2015/046313 A1 | 4/2015 |

OTHER PUBLICATIONS

International Preliminary on Patentability Report dated Jun. 26, 2018, issued by the International Searching Authority in application No. PCT/JP2016/088573.

Written Opinion dated Feb. 14, 2017, issued by the International Searching Authority in application No. PCT/JP2016/088573.

International Search Report for PCT/JP2016/088573, dated Feb. 14, 2017.

Communication dated Feb. 4, 2020, issued by the Japan Patent Office in corresponding application No. 2017-558312.

Communication dated Aug. 17, 2020, from the State Intellectual Property Office of the P.R.C. in corresponding application No. 201680074732.2.

* cited by examiner

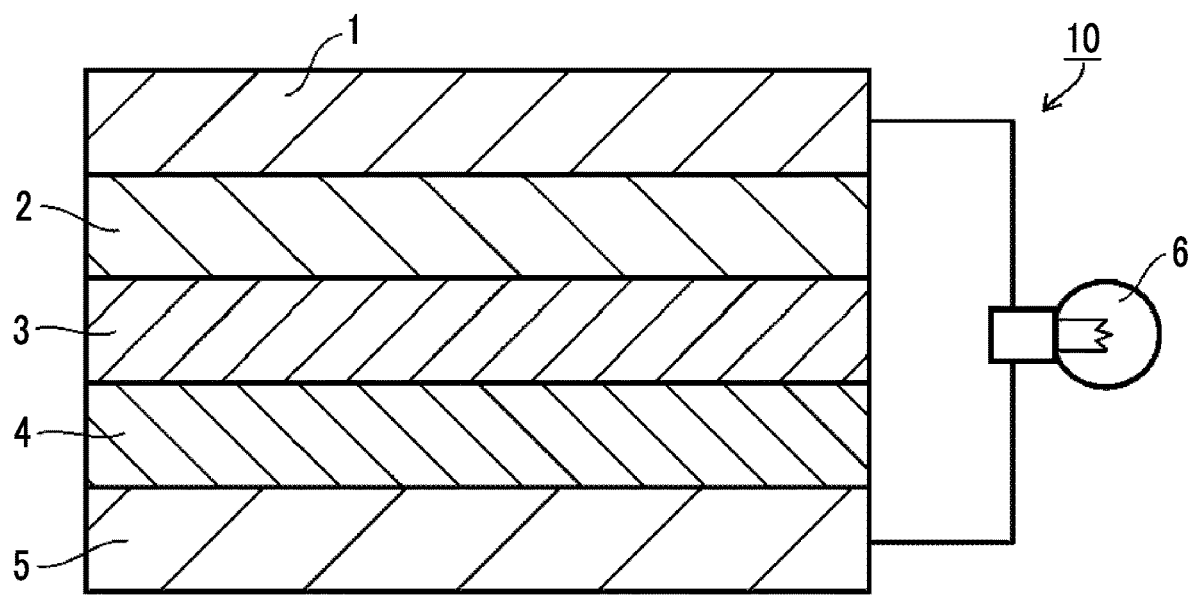

ALL-SOLID STATE SECONDARY BATTERY, PARTICLES FOR ALL-SOLID STATE SECONDARY BATTERY, SOLID ELECTROLYTE COMPOSITION FOR ALL-SOLID STATE SECONDARY BATTERY, AND ELECTRODE SHEET FOR ALL-SOLID STATE SECONDARY BATTERY, AND METHODS FOR MANUFACTURING SAME

CROSS-REFERENCE TO RELATED APPLICATIONS

This application is a Continuation of PCT International Application No. PCT/JP2016/088573 filed on Dec. 22, 2016, which claims priority under 35 U.S.C. § 119 (a) to Japanese Patent Application No. 2015-255357 filed in Japan on Dec. 25, 2015. Each of the above applications is hereby expressly incorporated by reference, in its entirety, into the present application.

BACKGROUND OF THE INVENTION

1. Field of the Invention

The present invention relates to an all-solid state secondary battery, particles for an all-solid state secondary battery, a solid electrolyte composition for an all-solid state secondary battery, and an electrode sheet for an all-solid state secondary battery, and methods for manufacturing the same.

2. Description of the Related Art

For lithium ion batteries, electrolytic solutions have been used. Attempts are underway to produce all-solid state secondary batteries in which all constituent materials are solid by replacing the electrolytic solutions with solid electrolytes. Reliability in terms of all performance of batteries is an advantage of techniques of using inorganic solid electrolytes.

For example, to electrolytic solutions being used for lithium ion secondary batteries, flammable materials such as carbonate-based solvents are applied as media. In lithium ion secondary batteries, a variety of safety measures are employed. However, there is a concern that disadvantages may be caused during overcharging and the like, and there is a demand for additional efforts. All-solid state secondary batteries in which a solid electrolyte is used are considered as a fundamental solution therefor.

Another advantage of all-solid state secondary batteries is the suitability for increasing energy density by means of the stacking of electrodes. Specifically, it is possible to produce batteries having a structure in which electrodes and electrolytes are directly arranged in series. At this time, metal packages sealing battery cells and copper wires or bus-bars connecting battery cells may not be provided, and thus the energy density of batteries is significantly increased. In addition, favorable compatibility with positive electrode materials capable of increasing potentials and the like can also be considered as advantages.

Due to the individual advantages described above, all-solid state secondary batteries are being developed as next-generation lithium ion batteries. For example, JP2014-112485A describes a solid battery containing a hydrocarbon-based polymer having a crosslinking structure in any one of a positive electrode, a negative electrode, and an electrolyte layer including a sulfide-based solid electrolyte. In addition, JP2001-15153A describes an all-solid state secondary battery in which a plurality of battery elements provided by sequentially laminating a positive electrode made of an inorganic compound, a solid electrolyte, and a negative electrode is disposed on a collector, and the plurality of battery elements is disposed with gaps of 0.1 to 5,000 µm.

SUMMARY OF THE INVENTION

The invention described in JP2014-112485A intends to prevent the generation of dendrites and improve the cycle characteristic using the hydrocarbon-based polymer having a crosslinking structure while preventing the degradation of adhesiveness between the electrode layer and the solid electrolyte layer. However, in the solid battery described in the same document, the bonding property between solid particles of the solid electrolyte and the like is poor, and this poor bonding property causes poor handleability during the production of the solid battery. Meanwhile, in the all-solid state secondary battery described in JP2001-15153A as well, similarly, the bonding property between solid particles is poor.

Therefore, an object of the present invention is to provide an all-solid state secondary battery having an excellent bonding property between solid particles in individual layers, between individual layers, and between a layer and a collector. In addition, another object of the present invention is to provide particles for an all-solid state secondary battery having an excellent bonding property. In addition, still another object of the present invention is to provide a solid electrolyte composition for an all-solid state secondary battery and an electrode sheet for an all-solid state secondary battery which contain the particles for an all-solid state secondary battery. Furthermore, still another object of the present invention is to provide methods for manufacturing the all-solid state secondary battery, the particles for an all-solid state secondary battery, the solid electrolyte composition for an all-solid state secondary battery, and the electrode sheet for an all-solid state secondary battery.

As a result of intensive studies, the present inventors found that, in a case in which at least one kind of solid particles that are included in an all-solid state secondary battery such as an electrode active material or a sulfide-based inorganic solid electrolyte are exposed to actinic rays, whereby it is possible to produce functional groups (hydrophilization) so as to obtain a proportion of an oxygen element in the element composition of a solid particle surface in a specific range, additionally, affinity between the solid particles improves due to the production of functional groups, and the bonding property between solid particles in individual layers of the all-solid state secondary battery, between individual layers, and between a layer and a collector improves. The present invention has been made on the basis of this finding.

That is, the object is achieved by the following means.

<1> An all-solid state secondary battery comprising: sulfide-based inorganic solid electrolyte particles having conductivity for ions of metals belonging to Group I or II of the periodic table; and non-oxide-based electrode active material particles, in which a proportion of an oxygen element in an element composition of a surface of at least one kind of the sulfide-based inorganic solid electrolyte particles or the non-oxide-based electrode active material particles is 3.0 atm % or more.

<2> The all-solid state secondary battery according to <1>, further comprising: auxiliary conductive agent particles, in which a proportion of an oxygen element in an element composition of a surface of at least one kind of the sulfide-based inorganic solid electrolyte particles, the non-oxide-based electrode active material particles, or the auxiliary conductive agent particles is 3.0 atm % or more.

<3> The all-solid state secondary battery according to <1> or <2>, in which the proportion of the oxygen element in the element composition of a particle surface is set to 3.0 atm % or more by an actinic ray.

<4> The all-solid state secondary battery according to <2> or <3>, in which at least one kind of the non-oxide-based electrode active material particles or the auxiliary conductive agent particles are particles of a carbonaceous material in which the proportion of the oxygen element in the element composition of a surface is 3.0 atm % or more.

<5> The all-solid state secondary battery according to any one of <1> to <4>, in which the proportion of the oxygen element in the element composition of a surface of at least one kind of particles is 3.0 atm % or more, and one or more Raman spectral spectrum peaks are detected in at least one range of 2,800 $cm^{-1}$ to 3,700 $cm^{-1}$
1,600 $cm^{-1}$ to 1,800 $cm^{-1}$
1,020 $cm^{-1}$ to 1,250 $cm^1$.

<6> The all-solid state secondary battery according to any one of <1> to <5>, further comprising: a binder.

<7> The all-solid state secondary battery according to <6>, in which the binder has a basic group.

<8> A method for manufacturing the all-solid state secondary battery according to any one of <1> to <7>, comprising: a step of setting the proportion of the oxygen element in the element composition of a particle surface to 3.0 atm % or more by an actinic ray.

<9> The method for manufacturing the all-solid state secondary battery according to <8>, in which the actinic ray is plasma generated from a gas of any one of nitrogen, oxygen, hydrogen, carbon dioxide, ammonia, helium, and argon or a gas mixture of two or more thereof.

<10> The method for manufacturing the all-solid state secondary battery according to <9>, in which the plasma is low-temperature atmospheric pressure plasma.

<11> Particles for an all-solid state secondary battery which are sulfide-based inorganic solid electrolyte particles having conductivity for ions of metals belonging to Group I or II of the periodic table and non-oxide-based electrode active material particles or auxiliary conductive agent particles, in which a proportion of an oxygen element in an element composition of a surface is 3.0 atm % or more.

<12> A method for manufacturing the particles for an all-solid state secondary battery according to <11>, comprising: a step of setting the proportion of the oxygen element in the element composition of the particle surface to 3.0 atm % or more by an actinic ray.

<13> A solid electrolyte composition for an all-solid state secondary battery which is used for the all-solid state secondary battery according to any one of <1> to <7>, the solid electrolyte composition comprising: sulfide-based inorganic solid electrolyte particles having conductivity for ions of metals belonging to Group I or II of the periodic table; and non-oxide-based electrode active material particles, in which a proportion of an oxygen element in an element composition of a surface of at least one kind of the sulfide-based inorganic solid electrolyte particles or the non-oxide-based electrode active material particles is 3.0 atm % or more.

<14> The solid electrolyte composition for an all-solid state secondary battery according to <13>, further comprising: auxiliary conductive agent particles, in which a proportion of an oxygen element in an element composition of a surface of at least one kind of the sulfide-based inorganic solid electrolyte particles, the non-oxide-based electrode active material particles, or the auxiliary conductive agent particles is 3.0 atm % or more.

<15> A method for manufacturing the solid electrolyte composition for an all-solid state secondary battery according to <13> or <14>, comprising: a step of setting the proportion of the oxygen element in the element composition of the particle surface to 3.0 atm % or more by an actinic ray or firing.

<16> An electrode sheet for an all-solid state secondary battery which is used for the all-solid state secondary battery according to any one of <1> to <7>, the electrode sheet comprising: sulfide-based inorganic solid electrolyte particles having conductivity for ions of metals belonging to Group I or II of the periodic table; and non-oxide-based electrode active material particles, in which a proportion of an oxygen element in an element composition of a surface of at least one kind of the sulfide-based inorganic solid electrolyte particles or the non-oxide-based electrode active material particles is 3.0 atm % or more.

<17> The electrode sheet for an all-solid state secondary battery according to <16>, further comprising: auxiliary conductive agent particles, in which a proportion of an oxygen element in an element composition of a surface of at least one kind of the sulfide-based inorganic solid electrolyte particles, the non-oxide-based electrode active material particles, or the auxiliary conductive agent particles is 3.0 atm % or more.

<18> A method for manufacturing the electrode sheet for an all-solid state secondary battery according to <16>, comprising: Steps [1] and [2] below in this order.

[1] A step of applying a solid electrolyte composition containing sulfide-based inorganic solid electrolyte particles having conductivity for ions of metals belonging to Group I or II of the periodic table and non-oxide-based electrode active material particles.

[2] A step of setting the proportion of the oxygen element in the element composition of the particle surface to 3.0 atm % or more by irradiating the solid electrolyte composition with an actinic ray.

<19> A method for manufacturing the electrode sheet for an all-solid state secondary battery according to <17>, comprising: Steps [1] and [2] below in this order.

[1] A step of applying a solid electrolyte composition containing sulfide-based inorganic solid electrolyte particles having conductivity for ions of metals belonging to Group I or II of the periodic table, non-oxide-based electrode active material particles, and auxiliary conductive agent particles.

[2] A step of setting the proportion of the oxygen atom in the element composition of the particle surface to 3.0 atm % or more by irradiating the solid electrolyte composition with an actinic ray.

In the description of the present invention, numerical ranges expressed using "to" include numerical values before and after "to" as the lower limit value and the upper limit value.

In the description of the present invention, "acryl" or "(meth)acryl" is used to refer to both methacryl and acryl.

In the description of the present invention, the proportion of the oxygen element in the element composition of the particle surface refers to a value computed by X-ray photoelectron spectroscopy (XPS (trade name: PHI 5000 VersaProbe II, ULVAC-PHI, Incorporated)).

A photoelectron spectrum that is obtained by photoelectron spectroscopy shows the bond energy value (eV) of a measurement electron to the atomic nucleus in the horizontal axis and the intensity of an emitted photoelectron in the vertical axis. The bond energy value is a value that is dependent on an element, the electron state, and the like and thus enables the compositional analyses of materials from the energy value. A quantitative value is obtained by computing the area intensity of each peak intensity.

The proportion of the oxygen atom is computed from a peak that is detected at 528.1 eV to 533.7 eV which is the bond energy value of the is electron orbit to the atomic nucleus.

The all-solid state secondary battery of the present invention is excellent in terms of the bonding property between solid particles in the individual layers, between the individual layers, and between the layer and the collector. The particles for an all-solid state secondary battery of the present invention are excellent in terms of the bonding property. In addition, the solid electrolyte composition for an all-solid state secondary battery of the present invention is capable of enhancing the bonding property between solid particles in individual layers of an all-solid state secondary battery, between the individual layers, and between the layer and a collector by being used in the all-solid state secondary battery. In addition, the electrode sheet for an all-solid state secondary battery of the present invention is capable of enhancing the bonding property between solid particles in individual layers of an all-solid state secondary battery, between the individual layers, and between the layer and a collector by being used to produce the all-solid state secondary battery. Furthermore, it is possible to manufacture the all-solid state secondary battery, the particles for an all-solid state secondary battery, the solid electrolyte composition for an all-solid state secondary battery, and the electrode sheet for an all-solid state secondary battery using the manufacturing methods of the present invention.

The above-described and other characteristics and advantages of the present invention will be further clarified by the following description with appropriate reference to the accompanying drawings.

BRIEF DESCRIPTION OF THE DRAWING

FIG. 1 is a vertical cross-sectional view schematically illustrating an all-solid state secondary battery according to a preferred embodiment of the present invention.

DESCRIPTION OF THE PREFERRED EMBODIMENTS

Preferred Embodiment

FIG. 1 is a cross-sectional view schematically illustrating an all-solid state secondary battery (lithium ion secondary battery) according to a preferred embodiment of the present invention. In the case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. The individual layers are in contact with one another and have a laminated structure. In a case in which the above-described structure is employed, during charging, electrons (e$^-$) are supplied to the negative electrode side, and lithium ions (Li$^+$) are accumulated on the negative electrode side. On the other hand, during discharging, the lithium ions (Li$^-$) accumulated on the negative electrode side return to the positive electrode, and electrons are supplied to an operation portion 6. In the example illustrated in the drawing, an electric bulb is employed as the operation portion 6 and is lit by discharging. A solid electrolyte composition for an all-solid state secondary battery of the present invention can be preferably used as a material forming the negative electrode active material layer, the positive electrode active material layer, and the solid electrolyte layer.

The thicknesses of the positive electrode active material layer 4, the solid electrolyte layer 3, and the negative electrode active material layer 2 are not particularly limited. Meanwhile, in a case in which the dimensions of ordinary batteries are taken into account, the thicknesses are preferably 10 to 1,000 μm and more preferably 20 μm or more and less than 500 μm. In the all-solid state secondary battery of the present invention, the thickness of at least one layer of the positive electrode active material layer 4, the solid electrolyte layer 3, or the negative electrode active material layer 2 is still more preferably 50 μm or more and less than 500 μm.

In the present specification, there are cases in which the positive electrode active material layer and the negative electrode active material layer are collectively referred to as electrode layers. In addition, as electrode active materials that can be used in the present invention, there are a positive electrode active material that is included in the positive electrode active material layer and a negative electrode active material that is included in the negative electrode active material layer, and there are cases in which either or both layers are simply referred to as active materials or electrode active materials.

Hereinafter, a solid electrolyte composition for an all-solid state secondary battery of the present invention which can be preferably used to manufacture an all-solid state secondary battery of the present invention will be described.

<Solid Electrolyte Composition for all-Solid State Secondary Battery>

A solid electrolyte composition for an all-solid state secondary battery of the present invention includes sulfide-based inorganic solid electrolyte particles having conductivity for ions of metals belonging to Group I or II of the periodic table and non-oxide-based electrode active material particles. In addition, the solid electrolyte composition for an all-solid state secondary battery of the present invention preferably includes auxiliary conductive agent particles.

Here, in the solid electrolyte composition for an all-solid state secondary battery of the present invention, the proportion of an oxygen element in the element composition of the surface of at least one kind of the sulfide-based inorganic solid electrolyte particles or the non-oxide-based electrode active material particles is 3.0 atm % or more. In addition, in a case in which the solid electrolyte composition for an all-solid state secondary battery of the present invention includes auxiliary conductive agent particles, the proportion of an oxygen element in the element composition of the surface of at least one kind of the sulfide-based inorganic solid electrolyte particles, the non-oxide-based electrode active material particles, or the auxiliary conductive agent particles is 3.0 atm % or more.

Hereinafter, sulfide-based inorganic solid electrolyte particles in which the proportion of an oxygen element in the element composition of the surface is 3.0 atm % or more, non-oxide-based electrode active material particles in which the proportion of an oxygen element in the element composition of the surface is 3.0 atm % or more, and auxiliary conductive agent particles in which the proportion of an oxygen element in the element composition of the surface is 3.0 atm % or more will be referred to as the particles for an all-solid state secondary battery of the present invention.

Meanwhile, hereinafter, there are also cases in which sulfide-based inorganic solid electrolyte particles will be referred to as an inorganic solid electrolyte, non-oxide-based electrode active material particles will be referred to as an electrode active material, and auxiliary conductive agent particles will be referred to as an auxiliary conductive agent.

(Inorganic Solid Electrolyte)

The inorganic solid electrolyte is an inorganic solid electrolyte, and the solid electrolyte refers to a solid capable of migrating ions therein.

The inorganic solid electrolyte is clearly differentiated from organic solid electrolytes (polymer electrolytes represented by polyethylene oxide (PEO) or the like and organic electrolyte salts represented by lithium bis(trifluoromethanesulfonyl)imide (LiTFSI)) since the inorganic solid electrolyte does not include any organic substances, that is, a carbon atom. In addition, the inorganic solid electrolyte is a solid in a static state, and thus cations and anions are not disassociated or liberated, and the inorganic solid electrolyte is also clearly differentiated from inorganic electrolyte salts in which cations and anions are disassociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as the inorganic solid electrolyte has conductivity for ions of metal elements belonging to Group I or II of the periodic table and is generally a substance not having electron conductivity.

In the present invention, a sulfide-based inorganic solid electrolyte having conductivity for ions of metal elements belonging to Group I or II of the periodic table is added to the solid electrolyte composition for an all-solid state secondary battery.

[Sulfide-Based Inorganic Solid Electrolytes]

Sulfide inorganic solid electrolytes are not particularly limited as long as the sulfide inorganic solid electrolytes contain sulfur atoms (S), have ion conductivity for metal elements belonging to Group I or II of the periodic table, and have an electron-insulating property. The sulfide inorganic solid electrolyte is, for example, a lithium ion-conductive inorganic solid electrolyte satisfying a composition represented by Formula (1).

$$Li_a M^1_b P_c S_d A_e \qquad (1)$$

In Formula (1), $M^1$ represents an element selected from B, Zn, Sn, Si, Cu, Ga, Sb, Al, and Ge. Among these, B, Sn, Si, Al, and Ge are preferred, and Sn, Al, and Ge are more preferred. A represents I, Br, Cl, and F and is preferably I or Br and particularly preferably I. a to e represent the compositional ratios among the individual elements, and a:b:c:d:e preferably satisfies 1 to 12:0 to 1:1:2 to 12:0 to 5. Furthermore, a is preferably 1 to 9 and more preferably 1.5 to 4. Furthermore, b is preferably 0 to 0.5. Furthermore, d is preferably 3 to 7 and more preferably 3.25 to 4.5. Furthermore, e is preferably 0 to 3 and more preferably 0 to 2.

In Formula (1), the compositional ratios among Li, $M^1$, P, and S are preferably b=0 and e=0, more preferably b=0, e=0, and the ratio among a, c, and d (a:b:c) is 1 to 9:1:3 to 7, and still more preferably b=0, e=0, and a:c:d=1.5 to 4:1:3.25 to 4.5.

The compositional ratios among the individual elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized.

The ratio between $Li_2S$ and $P_2S_5$ in Li—P—S-based glass and Li—P—S-based glass ceramic is preferably 65:35 to 85:15 and more preferably 68:32 to 75:25 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-}$ S/cm or more. The upper limit is not particularly limited, but realistically $1\times10^{-1}$ S/cm or less.

In the present invention, Li—P—S-based glass is preferably used.

Specific examples of compounds of the sulfide-based inorganic solid electrolytes include compounds formed using a raw material composition containing, for example, $Li_2S$ and a sulfide of an element of Groups XIII to XV. More specific examples thereof include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Among these, crystalline and/or amorphous raw material compositions consisting of $Li_2S$—$P_2S_5$, $Li_2S$—$GeS_2$—$Ga_2S_3$, $Li_2S$—LiI—$P_2S_5$, $Li_2S$—LiI—$Li_2O$—$P_2S_5$, $Li_2S$—$GeS_2$—$P_2S_5$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—$Li_3PO_4$—$P_2S_5$, $Li_2S$—$GeS_2$—$P_2S_5$, and $Li_{10}GeP_2S_{12}$ are preferred due to their high lithium ion conductivity. Examples of a method for synthesizing sulfide-based inorganic solid electrolyte materials using the above-described raw material compositions include an amorphization method. Examples of the amorphization method include a mechanical milling method and a melting quenching method. Among these, the mechanical milling method is preferred. This is because treatments at normal temperature become possible, and it is possible to simplify manufacturing steps.

These inorganic solid electrolytes may be used singly or two or more inorganic solid electrolytes may be used in combination.

The average particle size of the inorganic solid electrolyte is not particularly limited, but is preferably 0.01 μm or more and more preferably 0.1 μm or more. The upper limit is preferably 100 μm or less and more preferably 50 μm or less.

When the satisfaction of both the battery performance and the interface resistance-reducing and maintaining effect is taken into account, the content of the inorganic solid electrolyte in the solid electrolyte composition for an all-solid state secondary battery is preferably 5% by mass or more, more preferably 10% by mass or more, and particularly preferably 20% by mass or more with respect to 100% by mass of the solid components. From the same viewpoint, the upper limit is preferably 99.9% by mass or less, more preferably 99.5% by mass or less, and particularly preferably 99.0% by mass or less. Here, in the case of being used together with a positive electrode active material or a negative electrode active material described below, the total content is preferably in the above-described range.

Meanwhile, in the present specification, solid components refer to components that do not disappear due to volatilization or evaporation in the case of being dried at 170° C. for six hours and typically indicate components other than a dispersion medium described below. In addition, the content of solid components in the all-solid state secondary battery and the electrode sheet for an all-solid state secondary battery is preferably the same as the content of solid components in the solid electrolyte composition for an all-solid state secondary battery.

Next, electrode active materials that are used in the solid electrolyte composition for an all-solid state secondary battery of the present invention will be described. In the present invention, non-oxide-based electrode active material particles not including any oxygen element are used.

Meanwhile, in the present specification, there will be cases in which a solid electrolyte composition for an all-solid state secondary battery for forming the positive electrode active material layer is referred to as a composition for a positive electrode. On the other hand, there will be cases in which a solid electrolyte composition for an all-solid state secondary battery for forming the negative electrode active material layer is referred to as a composition for a negative electrode.

(Positive Electrode Active Material)

A positive electrode active material is preferably a positive electrode active material capable of reversibly intercalating and deintercalating lithium ions. The above-described material is not particularly limited as long as the material does not contain oxygen atoms, and examples thereof include metal atoms, sulfides or nitrides of the metal atoms, and atoms capable of complexing with Li such as sulfur.

Specific examples of the positive electrode active material not containing oxygen atoms include sulfur (preferably sulfur powder), titanium sulfide ($TiS_2$), lithium cobalt nitride (LiCoN), lithium silicon nitride (LiSiN), metallic lithium, lithium alloys ($LiM^2$; $M^2$ represents an atom selected from Sn, Si, Al, Ge, Sb, and P), lithium-storing intermetallic compounds ($Mgx^1M^3$; $M^3$ represents one selected from Sn, Ge, Sb, and XySb, and $x^1$ represents 0.1 to 10. X in XySb represents an atom selected from In, Cu, and Mn, and y represents 0.1 to 10), and derivatives thereof. In the present invention, sulfur is preferably used.

The volume-average particle diameter (circle-equivalent average particle diameter) of the positive electrode active material that is used in the all-solid state secondary battery of the present invention is not particularly limited. For example, the volume-average particle diameter is preferably 0.1 µm to 50 µm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. As the average particle diameter of the positive electrode active material particles, the volume-average particle diameter (circle-equivalent average particle diameter) of positive electrode active material particles cam be measured using, for example, a laser diffraction/scattering-type particle size distribution measurement instrument LA-920 (trade name, manufactured by Horiba Ltd.).

The chemical formulae of positive electrode active materials obtained using the firing method can be computed using an inductively coupled plasma (ICP) emission spectroscopic analysis method as a measurement method or, as a convenient method, from the mass difference of powder before and after firing.

The content of the positive electrode active material is not particularly limited, but is preferably 10% to 90% by mass and more preferably 20% to 80% by mass with respect to 100% by mass of the solid components in the solid electrolyte composition for an all-solid state secondary battery for forming the positive electrode active material layer.

The positive electrode active material may be used singly or two or more positive electrode active materials may be used in combination.

In addition, to the positive electrode active material layer, an auxiliary conductive agent may be appropriately added as necessary. As the auxiliary conductive agent, it is possible to use the auxiliary conductive agents described above.

(Negative Electrode Active Material)

Next, a negative electrode active material that is used in the solid electrolyte composition for an all-solid state secondary battery for forming the negative electrode active material layer in the all-solid state secondary battery of the present invention will be described. The negative electrode active material is preferably a negative electrode active material capable of reversibly intercalating and deintercalating lithium ions. The above-described material is not particularly limited as long as the material is a non-oxide-based material, and examples thereof include carbonaceous materials, a lithium single body or lithium alloys such as lithium aluminum alloys, metals capable of forming alloys with lithium such as Sn, Si, and In, and the like. Among these, carbonaceous materials are preferably used in terms of reliability.

The carbonaceous material that is used as the negative electrode active material is a material substantially including carbon. Examples thereof include petroleum pitch, natural graphite, artificial graphite such as highly oriented pyrolytic graphite, and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The average particle size of the negative electrode active material is preferably 0.1 µm to 60 µm. In order to provide a predetermined particle size, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out.

The chemical formulae of the carbonaceous material obtained by firing a variety of synthetic resins can be computed using an inductively coupled plasma (ICP) emission spectroscopic analysis method as a measurement method or, as a convenient method, from the mass difference of powder before and after firing.

Preferred examples of negative electrode active materials mainly containing Sn, Si, or Ge include carbonaceous materials capable of absorbing and deintercalating lithium ions or metallic lithium, lithium, lithium alloys, and metals capable of forming an alloy with lithium.

Among these, at least one negative electrode active material represented by Formula (A) is preferably included.

$$Si_xM^4_{(1-x)} \quad \text{Formula (A)}$$

In Formula (A), x represents a number of 0.01 or more and less than 1 and indicates a molar fraction. $M^4$ represents any one of a chalcogen element, a semimetal element, an alkali metal element, an alkali earth metal element, and a transition metal element or a combination thereof.

Preferably, M can be selected from chalcogen elements such as S and Se, semimetal elements such as B and Ge, alkali metal elements such as Li and Na, alkali earth metal elements such as Mg and Ca, and transition metal elements such as Ti, V, Mn, Fe, Co, Ni, and Cu. In addition, M may be a combination of two or more of the above-described elements.

Among these, the chalcogen elements or the transition metal elements are preferred, and the transition metal elements are more preferred. Among the transition metal elements, first transition metal elements are preferred, Ti, V, Mn, Fe, Co, Ni, and Cu are more preferred, and Ti, Mn, Fe, Co, and Ni are particularly preferred.

x is preferably 0.1 or more and less than 1, more preferably 0.1 or more and 0.99 or less, still more preferably 0.2 or more and 0.98 or less, and particularly preferably 0.3 or more and 0.95 or less.

The content of the negative electrode active material is not particularly limited, but is preferably 10 to 80% by mass and more preferably 20 to 70% by mass with respect to 100% by mass of the solid components in the solid electrolyte composition for an all-solid state secondary battery.

The negative electrode active material may be used singly or two or more negative electrode active materials may be used in combination.

In addition, to the negative electrode active material layer, an auxiliary conductive agent may be appropriately added as necessary. As the auxiliary conductive agent, it is possible to use the auxiliary conductive agents described above.

In the present invention, among the above-described negative electrode active materials, carbonaceous materials, tin, silicon (preferably silicon powder), indium, and sulfides thereof are preferred.

(Auxiliary Conductive Agent)

Next, the auxiliary conductive agent that is used in the present invention will be described. Substances that are generally known as auxiliary conductive agents can be used.

The auxiliary conductive agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene, all of which are electron-conductive materials, and also may be metal powder or a metal fiber of copper, nickel, or the like, and a conductive polymer such as polyaniline, polypyrrole, polythiophene, polyacetylene, or a polyphenylene derivative may also be used. In addition, these auxiliary conductive agents may be used singly or two or more auxiliary conductive agents may be used.

In the present invention, the carbonaceous material or acetylene black is preferably used.

In the present invention, at least one kind of the non-oxide-based electrode active material particles or the auxiliary conductive agent particles being used are preferably a carbonaceous material in which the proportion of an oxygen element in the element composition of the surface is 3.0 atm % or more, the non-oxide-based electrode active material particles are more preferably a carbonaceous material in which the proportion of an oxygen element in the element composition of the surface is 3.0 atm % or more, and the non-oxide-based negative electrode active material particles are particularly preferably a carbonaceous material in which the proportion of an oxygen element in the element composition of the surface is 3.0 atm % or more. The carbonaceous material is preferably the above-described graphite (preferably natural graphite).

The use of the carbonaceous material enables the all-solid state secondary battery of the present invention to absorb a large amount of Li and have a great battery capacity. In addition, the carbonaceous material is highly chemically stable to sulfide solid electrolytes and thus preferably used.

<Particles for all-Solid State Secondary Battery>

In the particles for an all-solid state secondary battery of the present invention, the surfaces of the sulfide-based inorganic solid electrolyte particles, the non-oxide-based electrode active material particles, or the auxiliary conductive agent particles are reformed, and thus the proportion of an oxygen element in the element composition of the surface is 3.0 atm % or more. The particle surfaces are hydrophilized, whereby it is possible to improve the wettability of the particles and improve the bonding property and the adhesiveness. The improvement of the bonding property and the adhesiveness enables the improvement of handleability and manufacturing suitability in the production of all-solid state secondary batteries and electrode sheets for an all-solid state secondary battery.

In a case in which the proportion of an oxygen element in the element composition of the surface is less than 3.0 atm %, adhesiveness between solid particles, between the layers, and between the layer and the collector is poor, the ion conductivity of all-solid state secondary batteries is insufficient, and it is not possible to obtain desired battery performance. The proportion of an oxygen element in the element composition is preferably 5.0 atm % or more and more preferably 7.0 atm % or more.

The upper limit is not particularly limited, but is preferably 50 atm % or less, more preferably 30 atm % or less, still more preferably less than 20 atm %, still more preferably 15 atm % or less, and still more preferably 12 atm % or less.

<Method for Reforming Particle Surfaces by Actinic Ray Exposure Treatment>

Hereinafter, sulfide-based inorganic solid electrolyte particles, non-oxide-based electrode active material particles, or auxiliary conductive agent particles which are not yet subjected to surface reforming by a method described below will be simply referred to as particles.

Particle surfaces can be hydrophilized by exposing the surfaces of the particles to an actinic ray and adding a predetermined amount of oxygen atom thereto.

The reason for hydrophilizing the surfaces of the particles is not only the removal of fat and oil such as organic substances attached to the particle surfaces but also the formation of bonds by a variety of groups and hetero atoms (for example, an oxygen atom or a nitrogen atom) on the particle surfaces due to the disassociation of covalent bonds or the generation of radicals by actinic ray energy and the resultant contact with the external air (Development of Technologies and Processes of Atmospheric Pressure Plasma (Akitoshi Okino, CMC Publishing Co., Ltd. (2011)) and Surface Treatment and Reforming Technologies of Inorganic Materials and Future Perspective: Metal, Ceramic, Glass (Eiji Kamijo/Yoshihiko Suzuki/Shou Fujisawa, CMC Publishing Co., Ltd. (2007))).

Preferred examples of the actinic ray in the present invention include an infrared ray, a microwave, an ultraviolet ray, excimer laser light, an electron beam (EB), an X-ray, a high-energy light ray having a wavelength of 50 nm or less (EUV or the like), plasma, and the like. The actinic ray is more preferably plasma and particularly preferably low-temperature atmospheric pressure plasma.

In the present invention, plasma is preferably used since the degree of hydrophilization is higher not only on the surfaces of particles irradiated with plasma but also in the surfaces compared with non-irradiated surfaces, and fine structures between particles are filled with gas, thereby exhibiting an effect of improving the bonding property.

The atmosphere for exposing the particles to the actinic ray is not particularly limited and may be a vacuum, the atmosphere, or other gaseous atmospheres. In order to make oxide present (oxidation) on the surfaces, oxygen is preferably present.

The exposure time is not particularly limited, but is preferably 1 second to 24 hours, more preferably 5 seconds to 1 hour, and particularly preferably 10 seconds to 10 minutes.

For the introduction of an oxygen element into the particle surfaces, there are a method in which the particle surfaces are treated with the actinic ray and then exposed to oxygen (the air) and a method in which an oxygen radical is directly sprayed (the actinic ray is radiated in an oxygen atmosphere or plasma of an oxygen-containing gas is radiated).

The content ratio of the oxygen element can be obtained using an X-ray photoelectron spectroscopy (abbreviated as XPS or ESCA). An X-ray is radiated on a sample surface, and the energy of a photoelectron being generated is measured, whereby the constituent elements of the sample and the electron states thereof can be analyzed. From the energy intensity of the photoelectron being generated, the element ratio can be found.

Since the space resolution is approximately 1 to 10 μm, it is possible to identify which particle is measured even in a case in which the sample is a sheet of a powder composition in which a solid electrolyte and an active material are mixed together such as the electrode active material layer in an all-solid state secondary battery. In addition, the measurement depth is 1 to 10 nm, and it is possible to obtain the element composition of the outer surfaces of the particles for an all-solid state secondary battery.

Examples of an oxygen element-containing functional group in a case in which the particle surface is hydrophilized and an oxygen element is (directly) bonded to the particle include functional groups that are obtained from an organic compound having a functional group containing an oxygen atom (an acetal, an alcohol, an aldehyde, an aldol, an ester, an ether, an enolate, an epoxide, a carboxylic acid, a carboxylic anhydride, a cyclic ether, a quinone, a ketene, a ketone, a hydroxy acid, a phenol, a lactide, a lactone, or the like). These functional groups can be detected using a Raman microscope. Hereinafter, a relationship between the Raman shift and a peak being observed will be described.

2,800 $cm^{-1}$ to 3,700 $cm^{-1}$: O—H stretching vibration
1,600 $cm^{-1}$ to 1,800 $cm^{-1}$: C=O stretching vibration
1,020 $cm^{-1}$ to 1,250 $cm^{-1}$: C—O stretching vibration In the present invention, it is preferable that the proportion of the oxygen element in the element composition of the surface of at least one kind of particles for an all-solid state secondary battery is 3.0 atm % or more and one or more spectrum peaks are detected in any of the above-described ranges. From the detection of spectrum peaks, the presence of the oxygen-containing functional groups can be confirmed, and it is found that the contribution of the hydrophilization effect is attributed to these functional groups.

Here, "spectrum peaks being detected" means a case in which the maximum value is "preferentially" present with respect to base lines connecting both ends of the individual ranges described above. "Being preferential" refers to certainty of the detection limit or more and the determination limit or more, and, in the present specification, "How to Consider Detection Limit and Determination Limit (analysis 2010 (5) p. 216)" is referred to.

The resolution of the Raman microscope is approximately 0.5 μm in the high-resolution region, and this Raman microscope has a resolution high enough to analyze the surface of each of the particles for an all-solid state secondary battery.

The actinic ray treatment can be carried out regardless of the state of the particles for an all-solid state secondary battery (a powder state or a state of being dispersed in a liquid such as a slurry). Furthermore, the actinic ray treatment can also be carried out on the surfaces of the particles for an all-solid state secondary battery even in a state in which the particles are included in the coated solid electrolyte layer or electrode active material layer. Any actinic rays can be radiated even after the production of an all-solid state secondary battery as long as the actinic rays have a wavelength short enough to permeate an appearance agent such as a laminate film that protects the all-solid state secondary battery.

The plasma that is used in the present invention may be any of vacuum plasma or atmospheric pressure plasma. Among them, low-temperature atmospheric pressure plasma that is generated under a condition of near the atmospheric pressure is preferably used. For example, it is possible to use a non-equilibrium plasma jet, low-temperature plasma by alternating-current pulse discharging, powder plasma, in-liquid plasma, torch-type plasma, tube plasma, or the like, and, in any cases, it is preferable to use plasma generated under a condition of near the atmospheric pressure.

For the radiation of plasma, a variety of atmospheric pressure plasma devices can be used. For example, a device in which an inert gas having a pressure near the atmospheric pressure is caused to flow between electrodes coated with a dielectric body and intermittent discharging is carried out, thereby generating low-temperature atmospheric pressure plasma or the like is preferred.

As the plasma device, a variety of modification examples can be selected depending on intended uses or the like. More specific examples thereof include the device that is used for the base plasma treatment in JP2008-60115A, the normal-pressure plasma device described in JP2004-228136A, and the plasma devices described in the specifications of JP2006-21972A, JP2007-188690A, WO2005/062338A, WO2007/024134A, WO2007/145513A, and the like. In addition, there are commercially available atmospheric pressure plasma devices, and, for example, it is also possible to preferably use atmospheric pressure plasma devices that are commercially available in the current market such as ATMP-1000 of Arios Inc., an atmospheric pressure plasma device of Heiden Laboratory Co., Ltd., an S5000 type atmospheric pressure low-temperature plasma jet device of Sakigake-Semiconductor Co., Ltd., powder plasma devices indicated as ASS-400 type, PPU-800 type, or SKIp-ZKB type, MyPL 100 and ILP-1500 of Well Inc., and RD 550 of Sekisui Chemical Co., Ltd. (all are trade names). In addition, in order to alleviate damage to the solid electrolyte layer or the electrode active material layer by avoiding the uneven concentration (streamer) of plasma, it is preferable to use, for example, a device in which an effort is made for an electric circuit by conducting electricity to a discharging portion through a pulse control element which is described in WO2005/062338A and WO2007/024134A.

Meanwhile, the "pressure near the atmospheric pressure" in the "low-temperature atmospheric pressure plasma" in the present invention refers to a range of 70 kPa or more and 130 kPa or less and is preferably a range of 90 kPa or more and 110 kPa or less.

As a discharging gas that is used to generate the atmospheric pressure plasma, it is possible to use a gas of any of nitrogen, oxygen, hydrogen, argon (Ar), helium (He), ammonia, and carbon dioxide or a gas mixture of two or more thereof. A noble gas of He, Ar, or the like which is an inert gas or an oxygen gas ($O_2$) is preferably used, and a noble gas of Ar or He is particularly preferred. In a case in which the plasma is applied to the surface of the solid electrolyte layer or the electrode active material layer, the inorganic solid electrolyte particles, the electrode active material particles, or the auxiliary conductive agent particles in the solid electrolyte layer or the electrode active material layer are hydrophilized by the plasma. In a case in which the plasma is applied to the surface of the solid electrolyte layer or the electrode active material layer, the hydrophilization rapidly proceeds.

Meanwhile, the plasma treatment may be carried out in a batch manner or in an inline manner by being connected to another step.

From the viewpoint of suppressing damage to the solid electrolyte layer or the electrode active material layer, it is effective to separate a plasma action portion and the discharging portion or generate uniform plasma by suppressing the generation of the local concentration (streamer) of the plasma through an effort on a discharging circuit. Particularly, the generation of uniform plasma is preferred since a uniform plasma treatment across a large area is possible. The plasma action and the discharging portion are preferably separated from each other by transporting plasma generated by discharging to the surface of the solid electrolyte layer or the electrode active material layer using an air stream of an inert gas and bringing the plasma into contact with the surface, and, particularly, a so-called plasma jet method is preferred. In this case, a path (conduction tube) for transporting the inert gas including the plasma is preferably a dielectric body such as glass, porcelain, or an organic polymer. As the generation of uniform plasma, the method in which uniform glow plasma in which streamer is suppressed by conducting electricity to an electrode coated with a dielectric body through the pulse control element is generated, which is described in the specifications of WO2005/062338A and WO2007/024134A, is preferred.

The distance from a supply nozzle of the inert gas including the plasma to the surface of the solid electrolyte layer or the electrode active material layer is preferably 0.01 mm to 100 mm and more preferably 1 mm to 20 mm.

A region on which the plasma treatment is carried out may be sufficiently supplied with an inert gas or filled with an inert gas. During the above-described transportation of the plasma using an inert gas, it is preferable to make the inert gas flow to a plasma generation portion even before the lighting of the plasma and make the inert gas continuously flow even after the lighting of the plasma.

Regarding the inert gas after the plasma treatment, since the plasma has a short service life, the inert gas may be exhausted without carrying out any special treatments, but the inert gas that has been used for the treatment may also be collected by providing an air inlet near a treated region.

As the temperature during the radiation of the plasma, a random temperature can be selected depending on the characteristics of the material in the solid electrolyte layer or the electrode active material layer that is irradiated with the plasma, but a temperature at which an increase in the temperature by the radiation of the low-temperature atmospheric pressure plasma is small is preferred since damage can be alleviated. In a case in which the plasma-applied region is separated from a plasma generation device, the above-described effect further improves.

In the above-described method, the low-temperature atmospheric pressure plasma is selected and radiated, whereby the supply of heat energy from the plasma can be alleviated, and it is possible to suppress an increase in the temperature of the solid electrolyte layer or the electrode active material layer. An increase in the temperature of the solid electrolyte layer or the electrode active material layer by the irradiation with the plasma is preferably 50° C. or lower, more preferably 40° C. or lower, and particularly preferably 20° C. or lower.

The temperature during the radiation of the plasma is preferably a temperature or lower at which the material in the solid electrolyte layer or the electrode active material layer that is irradiated with the plasma is sustainable, generally, preferably −196° C. or higher and lower than 150° C. and more preferably −21° C. or higher and 100° C. or lower.

Furthermore, the temperature is preferably −10° C. or higher and 80° C. or lower and more preferably a temperature near room temperature (25° C.) which is under the ambient temperature atmosphere. The low-temperature atmospheric pressure plasma in the present invention refers to plasma that is radiated at 0° C. or higher and 50° C. or lower.

<Method for Reforming Particle Surfaces by Firing>

In the present invention, it is also possible to introduce an oxygen element into the particles surfaces by firing.

A firing method is the exposure of the particles to a temperature of 200° C. or higher and 1,200° C. or lower, more preferably a temperature of 300° C. or higher and 900° C. or lower, and most preferably 350° C. or higher and 500° C. or lower. The atmosphere may be any of in the presence of oxygen, in the air, and an inert atmosphere (nitrogen, argon, or the like). In the case of being fired in an oxygen-free atmosphere, the particles are exposed to an oxygen atmosphere for a certain period of time after firing. In such a case, the particle surfaces are oxidized, an oxygen element is introduced thereinto, and the hydrophilicity of the surfaces improves. The particles are most preferably fired in the presence of oxygen. The firing time is 5 minutes to 24 hours, more preferably 10 minutes to 10 hours, and most preferably 30 minutes to 2 hours. As a device for firing, a firing furnace can be used, and, as the kind of the firing furnace, it is possible to preferably use an electric furnace, a gas furnace, a kerosene furnace, or the like.

(Binder)

The solid electrolyte composition for an all-solid state secondary battery of the present invention also preferably contains a binder.

The binder that is used in the present invention is not particularly limited as long as the binder is an organic polymer.

The binder that can be used in the present invention is preferably a binder that is generally used as a binding agent for positive electrodes or negative electrodes of battery materials, is not particularly limited, and is preferably, for example, a binder including resins described below.

Examples of fluorine-containing resins include polytetrafluoroethylene (PTFE), polyvinylene difluoride (PVdF), and copolymers of polyvinylene difluoride and hexafluoropropylene (PVdF-HFP).

Examples of hydrocarbon-based thermoplastic resins include polyethylene, polypropylene, styrene butadiene rubber (SBR), hydrogenated styrene butadiene rubber (HSBR), butylene rubber, acrylonitrile butadiene rubber, polybutadiene, polyisoprene, and the like.

Examples of acrylic resins include polymethyl (meth)acrylate, polyethyl (meth)acrylate, polyisopropyl (meth)acrylate, polyisobutyl (meth)acrylate, polybutyl (meth)acrylate, polyhexyl (meth)acrylate, polyoctyl (meth)acrylate, polydodecyl (meth)acrylate, polystearyl (meth)acrylate, poly 2-hydroxyethyl (meth)acrylate, poly(meth)acrylate, polybenzyl (meth)acrylate, polyglycidyl (meth)acrylate, polydimethylaminopropyl (meth)acrylate, and copolymers of monomers constituting the above-described resins.

In addition, copolymers with other vinyl-based monomers are also preferably used. Examples thereof include polymethyl (meth)acrylate-polystyrene copolymers, polymethyl (meth)acrylate-acrylonitrile copolymers, polybutyl (meth)acrylate-acrylonitrile-styrene copolymers, and the like.

Other than the radical polymerization-based polymer, a polycondensation-based polymer can also be used. As the polycondensation-based polymer, it is possible to preferably use a urethane resin, a urea resin, an amide resin, an imide resin, a polyester resin, or the like.

The polycondensation-based polymer preferably has a hard segment portion and a soft segment portion. The hard segment portion refers to a portion capable of forming an intermolecular hydrogen bond, and the soft segment portion generally refers to a flexible portion which has a glass transition temperature (Tg) of room temperature (25° C.±5° C.) or lower and a molecular weight of 400 or more.

The polycondensation-based polymers may be used singly or two or more polycondensation-based polymers may be used in combination.

Regarding the glass transition temperature of the binder, the upper limit is preferably 50° C. or lower, more preferably 0° C. or lower, and most preferably −20° C. or lower. The lower limit is preferably −100° C. or higher, more preferably −70° C. or higher, and particularly preferably −50° C. or higher.

The glass transition temperature (Tg) is measured using a dried specimen and a differential scanning calorimeter "X-DSC7000" (trade name, manufactured by SII•NanoTechnology Inc.) under the following conditions. The glass transition temperature of the same specimen is measured twice, and the measurement result of the second measurement is employed.

Atmosphere of the measurement chamber: Nitrogen (50 mL/min)
Temperature-increase rate: 5° C./min
Measurement-start temperature: −100° C.
Measurement-end temperature: 200° C.
Specimen pan: Aluminum pan
Mass of the measurement specimen: 5 mg
Calculation of Tg: Tg is calculated by rounding off the middle temperature between the declination-start point and the declination-end point in the DSC chart to the integer.

A polymer constituting the binder that is used in the present invention preferably has a moisture concentration of 100 ppm or less (mass-based) and Tg of 100° C. or lower.

In addition, the polymer constituting the binder that is used in the present invention may be dried by being crystallized or may be used in a polymer solution form. The amount of a metal-based catalyst (tin, titanium, or bismuth catalyst which is an urethanization or polyesterification catalyst) is preferably small. The concentration of metal in copolymers is preferably set to 100 ppm or less (mass-based) by decreasing the amount of the metal during polymerization or removing the catalyst by means of crystallization.

The solvent that is used for the polymerization reaction of the polymer is not particularly limited. Meanwhile, solvents that do not react with the inorganic solid electrolyte or the active materials and furthermore do not decompose the inorganic solid electrolyte or the active materials are desirably used. For example, it is possible to use hydrocarbon-based solvents (toluene, heptane, and xylene), ester-based solvents (ethyl acetate and propylene glycol monomethyl ether acetate), ether-based solvents (tetrahydrofuran, dioxane, and 1,2-diethoxyethane), ketone-based solvents (acetone, methyl ethyl ketone, and cyclohexanone), nitrile-based solvents (acetonitrile, propionitrile, butyronitrile, and isobutyronitrile), and halogen-based solvents (dichloromethane and chloroform).

The mass average molecular weight of the polymer constituting the binder that is used in the present invention is preferably 10,000 or more, more preferably 20,000 or more, and still more preferably 50,000 or more. The upper limit is preferably 1,000,000 or less, more preferably 200,000 or less, and still more preferably 100,000 or less.

In the present invention, the molecular weight of the polymer refers to the mass average molecular weight unless particularly otherwise described. The mass average molecular weight can be measured as the polystyrene-equivalent molecular weight by means of GPC. At this time, the polystyrene-equivalent molecular weight is detected as RI using a GPC apparatus HLC-8220 (manufactured by Tosoh Corporation) and G3000HXL+G2000HXL as columns at a flow rate at 23° C. of 1 mL/min. An eluent can be selected from tetrahydrofuran (THF), chloroform, N-methyl-2-pyrrolidone (NMP), and m-cresol/chloroform (manufactured by Shonanwako Junyaku), and THF is used in a case in which the polymer needs to be dissolved.

In a case in which favorable interface resistance-reducing and maintaining properties are taken into account when the binder is used in all-solid state secondary batteries, the content of the binder in the solid electrolyte composition for an all-solid state secondary battery is preferably 0.01% by mass or more, more preferably 0.1% by mass or more, and still more preferably 1% by mass or more with respect to 100% by mass of the solid components. From the viewpoint of battery characteristics, the upper limit is preferably 20% by mass or less, more preferably 10% by mass or less, and still more preferably 8% by mass or less.

In the present invention, the mass ratio [(the mass of the inorganic solid electrolyte and the mass of the electrode active materials)/the mass of the binder] of the total mass of the inorganic solid electrolyte and the electrode active materials that are added as necessary to the mass of the binder is preferably in a range of 1,000 to 1. This ratio is more preferably 500 to 2 and still more preferably 100 to 10.

Furthermore, the binder preferably has a substituent X which is a basic group. This is because the particle surfaces for an all-solid state secondary battery are modified with an oxygen atom and exhibit acidity, and thus the ionic interaction with basic groups becomes stronger, and thus a stronger bonding property can be developed.

The substituent X represents a group containing a functional group in which the pKa of a conjugated acid is 14 or less (functional group X), and the pKa of the conjugated acid in the substituent X is preferably 10 or less, more preferably 8 or less, and particularly preferably 6 or less. The lower limit of the pKa of the conjugated acid is preferably −10 or more, more preferably −5 or more, and particularly preferably 0 or more. The "pKa" mentioned herein is a value according to the definition described in Chemistry Handbooks (II) (4$^{th}$ revised edition, 1993, The Chemistry Society of Japan, Maruzen-Yushodo Company, Limited). The measurement temperature is set to 25° C. in terms of the water temperature.

The structure of the functional group X in which the pKa of the conjugated acid is 14 or less is not particularly limited as long as the functional group has physical properties that satisfy the above-described condition. As the pKa of the conjugated acid, the pKa described in Bordwell pKa Table can be used.

Specific examples of the functional group X include amines.

—$NH_3^+$ (the pKa of the conjugated acid of —$NH_2$) 10.66
—$NR^1R^2H^+$ (the pKa of the conjugated acid of —$NR^1R^2$) in a case in which $R^1R^2$ is an alkyl group, 9.0 to 11.0, in a case in which $R^1$ is an alkyl group and $R^2$ is an aryl group, 2.0 to 5.0, and the like.

In the present invention, RI and $R^2$ are preferably an alkyl group having 1 to 18 carbon atoms, specific examples thereof include methyl, ethyl, butyl, isobutyl, cyclohexyl, and benzyl, and a methyl group is preferred. Meanwhile, $R^1$ and $R^2$ may be an appropriate divalent group and form a ring. Examples of the above-described cyclic amine include piperidine, pyrrolidine, morpholine, and the like.

In addition to the above-described amines, examples thereof include nitriles and the like.

The binder that is used in the present invention is also preferably polymer particles holding a particle shape. In the present invention, a copolymer of polyvinylene difluoride and hexafluoropropylene (PVdF-HFP), a copolymer of polymethyl methacrylate and 2-(dimethylaminoethyl) methacrylate (PMMA-DMEAMA), polymethyl (meth)acrylate (PMMA), or a poly(methyl methacrylate-methacrylic acid) copolymer (PMMA-PMA) is preferably used.

Here, the "polymer particles" refer to polymer particles which do not fully dissolve even in the case of being added to a dispersion medium described below, disperse in the dispersion medium while maintaining the particle shape, and have an average particle diameter of more than 0.01 μm.

The shape of the polymer particles is not limited as long as the polymer particles hold a solid form. The polymer particles may be monodispersed or polydispersed. The polymer particle may have a truly spherical shape or a flat shape and furthermore may have an irregular shape. The surface of the polymer particle may be flat or form an uneven shape. The polymer particle may have a core shell structure, and the core (inner core) and the shell (outer shell) may be constituted of the same material or different materials. In addition, the polymer particle may be hollow, and the ratio of being hollow is not limited.

The polymer particles can be synthesized using a method in which the polymer particles are polymerized in the presence of a surfactant, an emulsifier, or a dispersant or a method in which the polymer particles are precipitated in a crystal shape as the molecular weight increases.

In addition, an existing method in which a polymer is mechanically crushed or an existing method in which a polymer liquid is most deposited, thereby producing fine particles may also be used.

The average particle diameter of the polymer particles is preferably 0.01 μm to 100 μm, more preferably 0.05 μm to 50 μm, still more preferably 0.1 μm to 20 μm, and particularly more preferably 0.2 μm to 10 μm.

The average particle diameter of the polymer particles that are used in the present invention refers to an average particle diameter according to measurement conditions and a definition described below unless particularly otherwise described.

One percent by mass of a dispersion liquid is diluted and prepared using the polymer particles and a random solvent (a dispersion medium that is used to prepare the solid electrolyte composition for an all-solid state secondary battery, for example, heptane) in a 20 ml sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a quartz cell for measurement at a temperature of 25° C., and the obtained volume-average particle diameter is considered as the average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

Meanwhile, the average particle diameter can be measured from the produced all-solid state secondary battery by, for example, disassembling the battery, peeling the electrodes, measuring the average particle diameters of the electrode materials according to the above-described method for measuring the average particle diameter of the polymer particles, and subtracting the measurement value of the average particle diameter of particles other than the polymer particles which has been measured in advance.

Meanwhile, as the binder that is used in the present invention, commercially available products can be used. In addition, the binder can also be prepared using an ordinary method.

(Lithium Salt)

The solid electrolyte composition for an all-solid state secondary battery of the present invention also preferably contains a lithium salt.

The lithium salt is preferably a lithium salt that is ordinarily used in this kind of products and is not particularly limited. Examples thereof include LiTFSI and the lithium salts described in paragraphs 0082 to 0085 of JP2015-088486A. In the present invention, LiTFSI is preferably used.

The content of the lithium salt is preferably 0 parts by mass or more and more preferably 5 parts by mass or more with respect to 100 parts by mass of the solid electrolyte. The upper limit is preferably 50 parts by mass or less and more preferably 20 parts by mass or less.

(Dispersant)

The composition for an all-solid state secondary battery of the present invention preferably contains a dispersant. Since the particle surfaces are hydrophilization-treated, the wettability with the dispersant is improved, and thus the containment of the dispersant is preferred from the viewpoint of improving the bonding property.

The dispersant preferably consists of a low-molecular-weight molecule or an oligomer having a molecular weight of 200 or more and less than 3,000 and preferably contains at least one selected from a group of functional groups (I)

below and an alkyl group having 8 or more carbon atoms or an aryl group having 10 or more carbon atoms in the same molecule.

Group of functional groups (I): an acidic group, a group having a basic nitrogen atom, a (meth)acryl group, a (meth) acrylamide group, an alkoxysilyl group, an epoxy group, an oxetanyl group, an isocyanate group, a cyano group, a thiol group, and a hydroxy group The molecular weight of the dispersant is more preferably 300 or more and less than 2,000 and particularly preferably 500 or more and less than 1,000. In a case in which the molecular weight is less than the upper limit value, the particles do not easily agglomerate, and it is possible to effectively suppress a decrease of the output. In addition, in a case in which the molecular weight is equal to or more than the lower limit value, the dispersant does not easily volatilize in a stage of the application and drying of a solid electrolyte composition slurry for an all-solid state secondary battery.

Among the group of functional groups (I), acidic groups (for example, a carboxy group, a sulfonic acid group, and a phosphoric acid group), groups having a basic nitrogen atom (for example, an amino group), or a cyano group are preferred, and acidic groups are more preferred. Among acidic groups, a carboxy group is particularly preferred.

The dispersant has an alkyl group having 8 or more carbon atoms or an aryl group having 10 or more carbon atoms.

The alkyl group having 8 or more carbon atoms needs to be an alkyl group having a total of 8 or more carbon atoms, may be linear, branched, or cyclic, and may contain a hetero atom between carbon-carbon bonds even in a case in which the alkyl group is not a hydrocarbon. In addition, the alkyl group having 8 or more carbon atoms may be unsubstituted or may further have a substituent, and, in the case of having a substituent, the substituent is preferably a halogen atom. Furthermore, the alkyl group may have an unsaturated carbon-carbon bond in the middle.

Examples of the halogen atom include a fluorine atom, a chlorine atom, a bromine atom, an iodine atom, and the like, and a fluorine atom is preferred.

The alkyl group having 8 or more carbon atoms is preferably an alkyl group having 8 or more and 50 or less carbon atoms, more preferably an alkyl group having 8 or more and 30 or more and 50 or less carbon atoms, more preferably an alkyl group having 8 or more and 30 or less carbon atoms, still more preferably an alkyl group having 8 or more and 20 or less carbon atoms, and particularly preferably an alkyl group having 8 or more and 18 or less carbon atoms.

Specific examples thereof include a normal octyl group, a normal decyl group, a normal dodecyl group, a normal tetradecyl group, a normal hexadecyl group, a stearyl group, a lauryl group, a linole group, a linolen group, a 2-ethylhexyl group, a 2-ethyloctyl group, a 2-ethyldodecyl group, a polyethylene glycol monomethyl group, a perfluorooctyl group, a perfluorododecyl group, and the like.

Among these, a normal octyl group, a 2-ethylhexyl group, a normal nonyl group, a normal decyl group, a normal undecyl group, a normal dodecyl group, a normal tetradecyl group, and a normal octadecyl group (a stearyl group) are preferred.

In a case in which the alkyl group having 8 or more carbon atoms has a substituent, examples of the substituent include an aryl group having 6 or more carbon atoms such as a phenyl group or a naphthyl group, a halogen atom, and the like. For example, the alkyl group may be an alkyl group substituted with an aryl group or a halogenated alkyl group substituted with a halogen.

The aryl group having 10 or more carbon atoms needs to be an aryl group having 10 or more carbon atoms in total and may contain a hetero atom between carbon-carbon bonds even in a case in which the aryl group is not a hydrocarbon. In addition, the aryl group having 10 or more carbon atoms may be unsubstituted or may further have a substituent, and, in the case of further having a substituent, the substituent is preferably a halogen atom.

The aryl group having 10 or more carbon atoms is preferably an aryl group having 10 or more and 50 or less carbon atoms, more preferably an aryl group having 10 or more and 30 or less carbon atoms, still more preferably an aryl group having 10 or more and 20 or less carbon atoms, and particularly preferably an aryl group having 10 or more and 18 or less carbon atoms.

Specific examples thereof include a naphthyl group, an anthracenyl group, a pyrenyl group, a terphenyl group, a naphthacenyl group, a pentacenyl group, a benzopyrenyl group, a chrysenyl group, a triphenylenyl group, a corannulenyl group, a coronenyl group, an ovalenyl group, and the like.

Among these, a condensed ring-type aromatic hydrocarbon group is preferred.

In a case in which the aryl group having 10 or more carbon atoms has a substituent, examples of the substituent include alkyl groups having 8 or more carbon atoms such as a normal octyl group and a halogen atom. For example, the aryl group may be an aryl group substituted into an alkyl group.

A particularly preferred combination is a combination of a carboxy group and the alkyl group having 8 or more carbon atoms in the same molecule, and specifically, it is possible to preferably use a long-chain saturated fatty acid and a long-chain unsaturated fatty acid.

The dispersant more preferably has two or more groups represented by the group of functional groups (I) in the same molecule and two or more alkyl groups having 8 or more carbon atoms or aryl groups having 10 or more carbon atoms.

(Dispersion Medium)

The solid electrolyte composition for an all-solid state secondary battery of the present invention may contain a dispersion medium. The dispersion medium needs to be capable of dispersing the individual components described above, and specific examples thereof include the following media.

Examples of alcohol compound solvents include methyl alcohol, ethyl alcohol, 1-propyl alcohol, 2-propyl alcohol, 2-butanol, t-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, propylene glycol dimethyl ether, diethylene glycol monomethyl ether, diethylene glycol dimethyl ether (diglyme), triethylene glycol, polyethylene glycol, propylene glycol monomethyl ether, dipropylene glycol monomethyl ether, tripropylene glycol monomethyl ether, diethylene glycol monobutyl ether, and the like), dimethyl ether, diethyl ether, diisopropyl ether, dibutyl ether, cyclohexyl methyl ether, t-butyl methyl ether, tetrahydrofuran, and dioxane.

Examples of amide compound solvents include N,N-dimethylformamide, 1-methyl-2-pyrrolidone, 2-pyrrolidone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric triamide.

Examples of amino compound solvents include triethylamine, diisopropylethylamine, and tributylamine.

Examples of ketone compound solvents include acetone, methyl ethyl ketone, methyl isobutyl ketone, cyclohexanone, and diisobutyl ketone.

Examples of aromatic compound solvents include benzene, toluene, and xylene.

Examples of ester compound solvents include ethyl acetate, propyl acetate, butyl acetate, ethyl formate, propyl formate, butyl formate, ethyl lactate, propylene glycol monomethyl ether acetate, methyl isobutyrate, isopropyl isobutyrate, methyl pivalate, and isopropyl cyclohexanecarboxylate.

Examples of aliphatic compound solvents include pentane, hexane, heptane, octane, decane, and cyclohexane.

Examples of nitrile compound solvents include acetonitrile, propionitrile, and butyronitrile.

One kind of the dispersion medium may be used singly or two or more kinds of the dispersion media may be used in combination.

The boiling points of the dispersion medium at normal pressure (one atmosphere) are preferably 50° C. or higher and more preferably 70° C. or higher. The upper limit is preferably 250° C. or lower and more preferably 220° C. or lower.

In the present invention, at least one compound solvent of an alcohol compound solvent (preferably t-butanol), an ether compound solvent (preferably dibutyl ether, propylene glycol dimethyl ether, or diglyme), an amide compound solvent (preferably N,N-dimethylformamide), an aromatic compound solvent (preferably toluene), an ester compound solvent (preferably propylene glycol monomethyl ether acetate), or an aliphatic compound solvent (preferably heptane) is preferably used. In the present invention, as the dispersion medium, at least one of an ester compound solvent or a hydrocarbon-based solvent is preferably used, and a hydrocarbon-based solvent is particularly preferred. Examples of the hydrocarbon-based solvent include the aromatic compound solvent and the aliphatic compound solvent.

The use of the dispersion medium enables the prevention of the deterioration of the inorganic solid electrolyte and the obtainment of compositions in which the solid particles are dispersed.

(Moisture Content of Solid Electrolyte Composition for All-Solid State Secondary Battery)

The moisture content of the solid electrolyte composition for an all-solid state secondary battery of the present invention, that is, the moisture content as the solid electrolyte composition for an all-solid state secondary battery containing the dispersion medium is preferably 50 ppm or less, more preferably 40 ppm or less, and still more preferably 30 ppm or less. The lower limit value of the moisture content is not particularly limited, but is realistically 0.001 ppm or more.

Meanwhile, the moisture content of the solid electrolyte composition for an all-solid state secondary battery can be measured using the Karl Fischer method. As the measurement instrument, for example, a moisture meter CA-200 (trade name, manufactured by Mitsubishi Chemical Analytech Co., Ltd.) can be used, and, as the Karl Fischer solution, AQUAMICRON AX (trade name, manufactured by Mitsubishi Chemical Corporation) can be used.

The moisture content in the above-described preferred range enables the suppression of reactions between a sulfide-based inorganic solid electrolyte and water.

The content of the dispersion medium is preferably 10 to 300 parts by mass and more preferably 50 to 150 parts by mass with respect to 100 parts by mass of the total solid content mass of the solid electrolyte composition for an all-solid state secondary battery.

<Collector (Metal Foil)>

The collector of the positive electrode and the collector of the negative electrode are preferably electron conductors. The collector of the positive electrode is preferably a collector obtained by treating the surface of an aluminum or stainless steel collector with carbon, nickel, titanium, or silver in addition to an aluminum collector, a stainless steel collector, a nickel collector, a titanium collector, or the like, and, among these, an aluminum collector and an aluminum alloy collector are more preferred. The collector of the negative electrode is preferably an aluminum collector, a copper collector, a stainless steel collector, a nickel collector, or a titanium collector and more preferably an aluminum collector, a copper collector, or a copper alloy collector.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 μm to 500 μm. In addition, the surface of the collector is preferably provided with protrusions and recesses by means of a surface treatment.

<Production of All-Solid State Secondary Battery>

The all-solid state secondary battery may be produced using an ordinary method. Specific examples thereof include a method in which the solid electrolyte composition for an all-solid state secondary battery of the present invention is applied onto a metal foil which serves as the collector, thereby producing an electrode sheet for an all-solid state secondary battery on which a coated film is formed.

In the all-solid state secondary battery of the present invention, the electrode layers contain active materials. From the viewpoint of improving ion conductivity, the electrode layers preferably contain the inorganic solid electrolyte. In addition, from the viewpoint of improving the bonding properties between solid particles, between the individual layers, and between the electrode active material layer and the collector, the electrode layers preferably contain the binder.

The solid electrolyte layer contains the inorganic solid electrolyte. From the viewpoint of improving the bonding properties between solid particles and between layers, the solid electrolyte layer also preferably contains the binder.

For example, the solid electrolyte composition for an all-solid state secondary battery of the present invention which serves as a positive electrode material is applied onto a metal foil which is a positive electrode collector so as to form a positive electrode active material layer, thereby producing a positive electrode sheet for an all-solid state secondary battery. A composition for forming the solid electrolyte layer is applied onto the positive electrode active material layer, thereby forming a solid electrolyte layer. Furthermore, the solid electrolyte composition for an all-solid state secondary battery of the present invention which serves as a negative electrode material is applied onto the solid electrolyte layer, thereby forming a negative electrode active material layer. A collector on the negative electrode side (metal foil) is overlaid on the negative electrode active material layer, whereby it is possible to obtain a structure of an all-solid state secondary battery in which the solid electrolyte layer is sandwiched between a positive electrode layer and a negative electrode layer.

Meanwhile, the individual compositions described above may be applied using an ordinary method. At this time, the solid electrolyte composition for an all-solid state secondary battery of the present invention for forming the positive electrode active material layer, the composition for forming the inorganic solid electrolyte layer, and the solid electrolyte composition for an all-solid state secondary battery of the present invention for forming the negative electrode active material layer may be dried after being applied respectively or may be dried after being applied to multiple layers.

The drying temperature is not particularly limited. Meanwhile, the lower limit is preferably 30° C. or higher and more preferably 60° C. or higher, and the upper limit is preferably 300° C. or lower and more preferably 250° C. or lower. In a case in which the compositions are heated in the above-described temperature range, it is possible to remove the dispersion medium and form a solid state.

[Usages of All-Solid State Secondary Battery]

The all-solid state secondary battery of the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, backup power supplies, and the like. Additionally, examples of consumer usages include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

According to the preferred embodiment of the present invention, individual application forms as described below are derived.

[1] Solid electrolyte compositions for an all-solid state secondary battery including sulfide-based inorganic solid electrolyte particles having conductivity for ions of metals belonging to Group I or II of the periodic table, non-oxide-based electrode active material particles, and auxiliary conductive agent particles, in which the proportion of an oxygen element in the element composition of the surface of each of the sulfide-based inorganic solid electrolyte particles, the non-oxide-based electrode active material particles, and the auxiliary conductive agent particles is 3.0 atm % or more (compositions for an electrode that is a positive electrode or negative electrode).

[2] Electrode sheets for an all-solid state secondary battery including sulfide-based inorganic solid electrolyte particles having conductivity for ions of metals belonging to Group I or II of the periodic table, non-oxide-based electrode active material particles, and auxiliary conductive agent particles, in which the proportion of an oxygen element in the element composition of the surface of each of the sulfide-based inorganic solid electrolyte particles, the non-oxide-based electrode active material particles, and the auxiliary conductive agent particles is 3.0 atm % or more.

[3] All-solid state secondary batteries constituted using the above-described electrode sheet for an all-solid state secondary battery.

[4] Methods for manufacturing an electrode sheet for an all-solid state secondary battery in which the solid electrolyte composition for an all-solid state secondary battery is applied onto a metal foil, thereby forming a film.

[5] Methods for manufacturing an electrode sheet for an all-solid state secondary battery in which a wet slurry of the solid electrolyte composition for an all-solid state secondary battery is applied.

[6] Methods for manufacturing an all-solid state secondary battery in which all-solid state secondary batteries are manufactured using the method for manufacturing an electrode sheet for an all-solid state secondary battery.

Meanwhile, examples of the methods in which the solid electrolyte composition for an all-solid state secondary battery of the present invention is applied onto a collector include coating (wet-type coating, spray coating, spin coating, slit coating, stripe coating, bar coating, or dip coating), and wet-type coating (coating) is preferred.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery.

All-solid state secondary batteries are classified into organic (polymer) all-solid state secondary batteries in which a polymer compound such as polyethylene oxide is used as an electrolyte and inorganic all-solid state secondary batteries in which the Li—P—S-based glass, LLT, LLZ, or the like is used. Meanwhile, the application of polymer compounds to inorganic all-solid state secondary batteries is not inhibited, and polymer compounds can also be applied as binders of positive electrode active materials, negative electrode active materials, and inorganic solid electrolytes.

Inorganic solid electrolytes are differentiated from electrolytes in which the above-described polymer compound is used as an ion conductive medium (polymer electrolyte), and inorganic compounds serve as ion conductive media. Specific examples thereof include the Li—P—S-based glass. Inorganic solid electrolytes do not deintercalate positive ions (Li ions) and exhibit an ion transportation function. In contrast, there are cases in which materials serving as an ion supply source which is added to electrolytic solutions or solid electrolyte layers and deintercalates positive ions (Li ions) are referred to as electrolytes; however, in the case of being differentiated from electrolytes as the ion transportation materials, the materials are referred to as "electrolyte salts" or "supporting electrolytes". Examples of the electrolyte salts include LiTFSI.

In the present invention, "compositions" refer to mixtures obtained by uniformly mixing two or more components. Here, compositions may partially include agglomeration or uneven distribution as long as the compositions substantially maintain uniformity and exhibit desired effects.

EXAMPLES

Hereinafter, the present invention will be described in more detail on the basis of examples. Meanwhile, the present invention is not interpreted to be limited thereto. In the following examples, "parts" and "%" are mass-based unless particularly otherwise described. In addition, "-" used in the tables indicates that the corresponding components are not included in compositions of examples or the like. In addition, room temperature refers to 25° C.

<Synthesis of Sulfide-Based Inorganic Solid Electrolyte>
—Synthesis of Li—P—S-Based Glass—

As a sulfide-based inorganic solid electrolyte, Li—P—S-based glass was synthesized with reference to a non-patent document of T. Ohtomo, A. Hayashi, M. Tatsumisago, Y. Tsuchida, S. HamGa, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, injected into an agate mortar, and mixed using an agate muddler for five minutes. Meanwhile, the mixing ratio between $Li_2S$ and $P_2S_5$ ($Li_2S:P_2S_5$) was set to 75:25 in terms of molar ratio.

66 zirconia beads having a diameter of 5 mm were injected into a 45 mL zirconia container (manufactured by Fritsch Japan Co., Ltd.), the full amount of the mixture of the lithium sulfide and the diphosphorus pentasulfide was injected thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining yellow powder (6.20 g) of a sulfide solid electrolyte (Li—P—S-based glass).

<Surface Treatment of Particles>
—UV Treatment—
[Preparation of Particles OR-11]

Natural graphite powder CGB-20 (trade name, manufactured by Nippon Kokuen Group) (20 g) was broken onto a TEFLON (registered trademark, E. I. du Pont de Nemours and Company) bat so as to become uniform and put into a UV treatment device OPL 1102 (trade name, manufactured by Mario Network Co., Ltd.), and an oxygen gas was blown into the device at room temperature for 10 minutes so as to form an oxygen atmosphere. The powder was irradiated with UV for 60 minutes, thereby obtaining surface-treated natural graphite powder.

The proportion of an oxygen element in the particle surface was obtained using XPS (trade name: PHI 5000 VersaProbe II, manufactured by Ulvac-Phi. Incorporated) and found out to be 5.2 atm %.

In addition, a new peak was detected in a region (I) (2,800 $cm^{-1}$ to 3,700 $cm^{-1}$) using a Raman microscope spectrum device (trade name: LabRAM HR Revolution, manufactured by Horiba Ltd.), and it was confirmed that oxygen-containing functional groups were directly bonded to the particle surfaces of the natural graphite powder. Particles OR-11 having reformed particle surfaces of the natural graphite powder were obtained in the above-described manner.

Particles OR-21, Particles OR-31, Particles OR-41, Particles OR-51, and Particles OR-52 shown in Table 1 below were obtained in the same manner.

—Electron Beam (EB) Treatment—
[Preparation of Particles OR-12]

Natural graphite powder CGB-20 (20 g) was broken onto a TEFLON bat so as to become uniform, put into an EB treatment device EC250/15/180L (trade name, manufactured by Eye Electron Beam Co., Ltd.), and irradiated with an electron beam at room temperature in a vacuum state for 20 minutes, thereby obtaining surface-treated natural graphite powder.

The proportion of an oxygen element in the particle surface was obtained using XPS and found out to be 3.6 atm %.

In addition, a new peak was detected in a region (I) using a Raman microscope spectrum device, and it was confirmed that oxygen-containing functional groups were directly bonded to the particle surfaces. Particles OR-12 having reformed particle surfaces of the natural graphite powder were obtained in the above-described manner.

Particles OR-42 and Particles OR-53 shown in Table 1 below were obtained in the same manner.

—Low-Temperature Atmospheric Pressure Plasma Treatment Method—
[Preparation of Particles OR-13]

Natural graphite powder CGB-20 20 g was added to an atmospheric pressure powder plasma device ASS-400 (trade name, manufactured by Sakigake-Semiconductor Co., Ltd.) and irradiated with oxygen plasma as low-temperature atmospheric pressure plasma for 20 minutes. The irradiation conditions are described below.

<Irradiation Conditions>

Irradiation temperature: Room temperature (25° C.)

Distance between natural graphite powder CGB-20 and nozzle of atmospheric pressure powder plasma device: 100 mm Flow rate of oxygen gas: 0.5 L/min Output: 250 W Rotation speed: 4 rpm Pressure: 100 kPa For the powder after the irradiation with the low-temperature atmospheric pressure plasma, the proportion of an oxygen element in the particle surface was obtained using XPS and found out to be 9.2 atm %.

In addition, new peaks were detected in the region (I), a region (II) (1,600 $cm^{-1}$ to 1,800 $cm^{-1}$), and a region (III) (1,020 $cm^{-1}$ to 1,250 $cm^{-1}$) using the Raman microscope spectrum device, and it was confirmed that oxygen-containing functional groups were directly bonded to the particle surfaces of the natural graphite powder. Particles OR-13 having reformed particle surfaces of the natural graphite powder were obtained in the above-described manner.

Particles OR-22, Particles OR-32, Particles OR-33, Particles OR-43, Particles OR-54, and Particles OR-55 shown in Table 1 below were obtained in the same manner.

TABLE 1

| Particles (after reforming) | Particles (before reforming) | Surface treatment method | | | XPS Surface oxygen element proportion (atm %) | Presence and absence of Raman spectrum peak | | |
|---|---|---|---|---|---|---|---|---|
| | | Actinic ray | Atmosphere | Treatment time (minutes) | | Region (I) | Region (II) | Region (III) |
| R-1 | Natural graphite (negative electrode active | No treatment | — | — | 2.1 | Absent | Absent | Absent |
| OR-11 | | UV | Oxygen gas | 60 | 5.7 | Present | Absent | Absent |
| OR-12 | | EB | Vacuum | 20 | 3.6 | Present | Absent | Absent |

TABLE 1-continued

| Particles (after reforming) | Particles (before material) | Surface treatment method | | Treatment time (minutes) | XPS Surface oxygen element proportion (atm %) | Presence and absence of Raman spectrum peak | | |
|---|---|---|---|---|---|---|---|---|
| | | Actinic ray | Atmosphere | | | Region (I) | Region (II) | Region (III) |
| OR-13 | material) | Atmospheric pressure plasma | Oxygen gas | 20 | 9.2 | Present | Present | Present |
| R-2 | Silicon powder (negative electrode active material) | No treatment | — | — | 0.2 | Absent | Absent | Absent |
| OR-21 | | UV | Air | 60 | 4.6 | Present | Absent | Present |
| OR-22 | | Atmospheric pressure plasma | Oxygen gas | 20 | 6.7 | Present | Present | Present |
| R-3 | Li-P-S (sulfide-based inorganic solid electrolyte) | No treatment | — | — | 0.1 | Absent | Absent | Absent |
| OR-31 | | UV | Oxygen gas | 60 | 3.4 | Present | Absent | Absent |
| OR-32 | | Atmospheric pressure plasma | Argon gas | 20 | 4.7 | Present | Present | Present |
| OR-33 | | Atmospheric pressure plasma | Oxygen gas | 20 | 5.6 | Present | Present | Present |
| R-4 | AB (auxiliary conductive agent) | No treatment | — | — | 1.8 | Absent | Absent | Absent |
| OR-41 | | UV | Oxygen gas | 60 | 6.9 | Present | Absent | Absent |
| OR-42 | | EB | Vacuum | 20 | 8.0 | Present | Absent | Absent |
| OR-43 | | Atmospheric pressure plasma | Argon (80%)/ oxygen (20%) gas | 20 | 10.3 | Present | Present | Present |
| R-5 | Sulfur powder (positive electrode active material) | No treatment | — | — | 0.0 | Absent | Absent | Absent |
| OR-51 | | UV | Air | 60 | 3.2 | Present | Absent | Absent |
| OR-52 | | UV | Oxygen gas | 240 | 3.8 | Present | Absent | Absent |
| OR-53 | | EB | Vacuum | 20 | 3.9 | Present | Absent | Absent |
| OR-54 | | Atmospheric pressure plasma | Oxygen gas | 20 | 5.2 | Present | Present | Present |
| OR-55 | | Atmospheric pressure plasma | Argon (80%)/ oxygen (20%) gas | 60 | 5.9 | Present | Present | Present |

<Notes of Table>
Li-P-S: Li-P-S-based glass synthesized above
AB: Acetylene black
(I): Region (I) 2,800 $cm^{-1}$ to 3,700 $cm^{-1}$
(II): Region (II) 1,600 $cm^{-1}$ to 1,800 $cm^{-1}$ and
(III): Region (III) 1,020 $cm^{-1}$ to 1,250 $cm^{-1}$.

[Examples and Comparative Examples]

—Production of Electrode Sheet for All-Solid State Secondary Battery S-1—

180 zirconia beads having a diameter of 5 mm were injected into a 45 mL zirconia container (manufactured by Fritsch Japan Co., Ltd.), and the surface-reformed negative electrode active material (Particles OR-11) (8.0 g), non-surface-reformed Li—P—S glass (Particles R-3) (4.0 g) as an inorganic solid electrolyte, and propylene glycol monomethyl ether acetate (15 g) as a dispersion medium were injected thereinto. After that, the container was set in a planetary ball mill P-7 (trade name) manufactured by Fritsch Japan Co., Ltd., and the components were continuously mixed at a temperature of 25° C. and a rotation speed of 300 rpm for two hours, thereby preparing a solid electrolyte composition slurry for an all-solid state secondary battery.

The solid electrolyte composition slurry for an all-solid state secondary battery was applied onto a 20 μm-thick aluminum foil using an applicator (trade name: SA-201 Baker type applicator, manufactured by Tester Sangyo Co., Ltd.), heated at 80° C. for one hour, and then further heated at 120° C. for one hour, thereby drying the dispersion medium. After that, the electrode active material layer was heated (at 150° C.) and pressurized (600 MPa for 10 seconds) using a heat pressing machine, thereby obtaining an electrode sheet for an all-solid state secondary battery S-1 in which the thickness of an electrode active material layer was 150 μm.

Electrode sheets for an all-solid state secondary battery S-2 to S-6 and HS-1 to HS-4 were obtained in the same manner as the electrode sheet for an all-solid state secondary battery S-1 except for the fact that components shown in Table 2 were used. Meanwhile, the amount of the positive electrode active material used was 8.0 g, the amount of the binder used was 1.0 g, and the amount of the auxiliary conductive agent used was 1 g.

—Production of Electrode Sheet for All-Solid State Secondary Battery S-7—

[Preparation of Solid Electrolyte Composition (Composition for Forming Positive Electrode Active Material Layer) Slurry for all-Solid State Secondary Battery]

A composition slurry for forming a positive electrode active material layer for forming a positive electrode active material layer of an electrode sheet for an all-solid state secondary battery S-7 was prepared in the same manner as the solid electrolyte composition slurry for an all-solid state secondary battery of the electrode sheet for an all-solid state secondary battery S-1 except for the fact that components shown in Table 2 (a positive electrode active material (8.0 g), an inorganic solid electrolyte (4.0 g), and a binder (1.0 g)) were used.

[Preparation of Composition Slurry for Solid Electrolyte Layer]

180 zirconia beads having a diameter of 5 mm were injected into a 45 mL zirconia container (manufactured by Fritsch Japan Co., Ltd.), and the surface-reformed inorganic solid electrolyte (Particles OR-32) (8 g), PMMA-DMEAMA (1.0 g) as a binder, and propylene glycol monomethyl ether acetate (10 g) as a dispersion medium were injected thereinto. After that, the container was set in a planetary ball mill P-7 (trade name) manufactured by Fritsch Japan Co., Ltd., and the components were continuously mixed at a temperature of 25° C. and a rotation speed of 300 rpm for two hours, thereby preparing a composition slurry for a solid electrolyte layer.

[Preparation of Solid Electrolyte Composition (Composition for Forming Negative Electrode Active Material Layer) Slurry for all-Solid State Secondary Battery]

A composition slurry for forming a negative electrode active material layer for forming a negative electrode active material layer of an electrode sheet for an all-solid state secondary battery S-7 was prepared in the same manner as the solid electrolyte composition slurry for an all-solid state secondary battery of the electrode sheet for an all-solid state secondary battery S-1 except for the fact that components shown in Table 2 (a negative electrode active material (8.0 g), an inorganic solid electrolyte (4.0 g), and a binder (1.0 g)) were used.

The composition slurry for forming a positive electrode active material layer was applied onto a 20 µm-thick aluminum foil using the applicator (trade name: SA-201 Baker type applicator, manufactured by Tester Sangyo Co., Ltd.), heated at 80° C. for one hour, and then further heated at 120° C. for one hour, thereby drying the dispersion medium. After that, the electrode active material layer was heated (at 150° C.) and pressurized (600 MPa for 10 seconds) using a heat pressing machine, thereby obtaining a positive electrode sheet for an all-solid state secondary battery in which the thickness of a positive electrode active material layer was 150 µm.

The composition slurry for forming a solid electrolyte layer was applied onto the positive electrode sheet for an all-solid state secondary battery produced above using the applicator (trade name: SA-201 Baker type applicator, manufactured by Tester Sangyo Co., Ltd.), heated at 80° C. for one hour, and then further heated at 110° C. for one hour, thereby forming a 50 µm-thick solid electrolyte layer. After that, the composition slurry for forming a negative electrode active material layer prepared above was further applied thereto, heated at 80° C. for one hour, and then further heated at 110° C. for one hour, thereby forming a 100 µm-thick negative electrode active material layer. The negative electrode active material layer was heated (at 120° C.) and pressurized (200 MPa for one minute) using a heat pressing machine, thereby obtaining an electrode sheet for an all-solid state secondary battery S-7.

Electrode sheets for an all-solid state secondary battery S-8 to S-11 and HS-5 were obtained in the same manner as the electrode sheet for an all-solid state secondary battery S-7 except for the fact that components shown in Table 2 were used. Meanwhile, in the production of Sheets S-11 and HS-5, the amount of an auxiliary conductive agent used in each of the slurries was 1 g.

S-1 to S-11 were electrode sheets for an all-solid state secondary battery satisfying the specifications of the present invention, and HS-1 to HS-5 were electrode sheets for an all-solid state secondary battery for comparison.

Meanwhile, in Table 2, an electrode sheet for an all-solid state secondary battery is expressed as "sheet".

<Testing>

A bonding property test was carried out on the electrode sheets for an all-solid state secondary battery produced above. Hereinafter, a testing method will be described. In addition, the measurement results are summarized in Table 2 below.

<Bonding Property Test>

A 180° peeling strength test (JIS Z0237-2009) was carried out on the obtained electrode sheet for an all-solid state secondary battery.

Pressure-sensitive adhesive tape (having a width of 24 mm and a length of 300 mm) (trade name: CELLOTAPE CT-24, manufactured by Nichiban Co., Ltd.) was attached to the electrode active material layer of the electrode sheet for an all-solid state secondary battery. An end of the tape was gripped, the tape was folded 180° and peeled off 25 mm from the electrode active material layer, then, a single end of the electrode sheet for an all-solid state secondary battery from which the pressure-sensitive adhesive tape had been peeled off was fixed to a lower-side holding device installed in the following testing machine, and the pressure-sensitive adhesive tape was fixed to an upper-side holding device.

Testing was carried out at a load speed of 300 mm/min. After the initiation of the measurement, the pressure-sensitive adhesive tape was peeled off 25 mm, and then the pressure-sensitive adhesive force values measured every 0.05 mm in the 50 mm-long tape portions peeled off from the electrode active material layer were averaged, thereby obtaining a value of the peeling pressure-sensitive adhesive force (average peeling strength (N)).

The average peeling strength that is high at this time indicates a strong bonding force.

The peeling strength was measured by combining a standard-type digital force gauge ZTS-5N and a vertical electric measurement standard MX2 series (both are trade names, manufactured by Imada Co., Ltd.).

Meanwhile, among the sheets in Table 2, for S-4 to S-6, HS-2, and HS-3, the test was carried out on the positive electrode active material layer, and for Sheets S-1 to S-3, S-7 to S-11, HS-1, HS-4, and HS-5, the test was carried out on the negative electrode active material layer.

TABLE 2

| | Sheet | Positive electrode active material | Inorganic solid electrolyte | Negative electrode active material | Auxiliary conductive agent | Binder | Average peeling strength (N) |
|---|---|---|---|---|---|---|---|
| Example 1 | S-1 | — | R-3 | OR-11 | — | — | 1.42 |
| Example 2 | S-2 | — | R-3 | OR-12 | — | — | 1.68 |
| Example 3 | S-3 | — | OR-31 | OR-13 | — | PVdF-HFP | 2.15 |
| Example 4 | S-4 | R-5 | OR-31 | — | OR-41 | PVdF-HFP | 2.54 |
| Example 5 | S-5 | OR-51 | OR-32 | — | OR-42 | PVdF-HFP | 2.30 |
| Example 6 | S-6 | OR-52 | OR-32 | — | OR-43 | PVdF-HFP | 2.80 |
| Example 7 | S-7 | OR-51 | OR-32 | OR-21 | — | PMMA-DMEAMA | 3.24 |
| Example 8 | S-8 | OR-52 | OR-33 | OR-22 | — | PMMA-DMEAMA | 3.55 |
| Example 9 | S-9 | OR-53 | OR-33 | OR-11 | — | PMMA | 3.23 |
| Example 10 | S-10 | OR-54 | OR-33 | OR-12 | — | PMMA-PMA | 3.54 |
| Example 11 | S-11 | OR-55 | OR-33 | OR-13 | OR-43 | PMMA-PMA | 3.25 |
| Comparative Example 1 | HS-1 | — | R-3 | R-1 | — | — | 0.35 |
| Comparative Example 2 | HS-2 | R-5 | R-3 | — | — | PVdF-HFP | 0.13 |
| Comparative Example 3 | HS-3 | R-5 | R-3 | — | R-4 | PMMA-DMEAMA | 0.17 |

TABLE 2-continued

|  | Sheet | Positive electrode active material | Inorganic solid electrolyte | Negative electrode active material | Auxiliary conductive agent | Binder | Average peeling strength (N) |
|---|---|---|---|---|---|---|---|
| Comparative Example 4 | HS-4 | — | R-3 | R-2 | R-4 | PMMA-DMEAMA | 0.19 |
| Comparative Example 5 | HS-5 | R-5 | R-3 | R-2 | R-4 | PMMA-PMA | 0.32 |

<Notes of Table>
PVdF-HFP: Copolymer of polyvinylene difluoride and hexafluoropropylene (manufactured by Arkema K.K.)
PMMA-DMEAMA: Copolymer of polymethyl methacrylate and 2-(dimethylaminoethyl) methacrylate, the molar ratio between PMMA and DMEAMA is 80:20 (prepared by a standard method of radical polymerization; the molar ratio indicates a monomer preparation ratio.)
PMMA: Polymethyl methacrylate having a mass average molecular weight of 70,000, manufactured by Aldrich-Sigma, Co. LLC.
PMMA-PMA: Poly(methyl methacrylate-methacrylic acid) copolymer having a mass average molecular weight of 70,000 and a molar ratio of 70:30 (prepared by a standard method of radical polymerization; the molar ratio indicates a monomer preparation ratio.)

As is clear from Table 2, it is found that the electrode sheets for an all-solid state secondary battery containing the particles for an all-solid state secondary battery of the present invention in which the particle surfaces were reformed with an oxygen element had a high peeling strength and an excellent bonding property.

From Table 2, it is clear that the all-solid state secondary battery of the present invention has a high peeling strength and an excellent bonding property.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery

What is claimed is:

1. An all-solid state secondary battery comprising:
sulfide-based inorganic solid electrolyte particles having conductivity for ions of metals belonging to Group I or II of the periodic table; and
non-oxide-based electrode active material particles,
wherein a proportion of an oxygen element in an element composition of a surface of at least one kind of the sulfide-based inorganic solid electrolyte particles or the non-oxide-based electrode active material particles is 3.0 atm % or more, and from said surface, one or more Raman spectral spectrum peaks are detected in at least one range of
2,800 $cm^{-1}$ to 3,700 $com^{-1}$,
1,600 $cm^{-1}$ to 1,800 $cm^{-1}$, or
1,020 $cm^{-1}$ to 1,250 $cm^{-1}$.

2. The all-solid state secondary battery according to claim 1,
wherein the proportion of the oxygen element in the element composition of a particle surface is set to 3.0 atm % or more by an actinic ray.

3. The all-solid state secondary battery according to claim 1, further comprising:
a binder.

4. The all-solid state secondary battery according to claim 3,
wherein the binder has a basic group.

5. A method for manufacturing the all-solid state secondary battery according to claim 1, comprising:
a step of setting the proportion of the oxygen element in the element composition of a particle surface to 3.0 atm % or more by an actinic ray.

6. The method for manufacturing the all-solid state secondary battery according to claim 5,
wherein the actinic ray is plasma generated from a gas of any one of nitrogen, oxygen, hydrogen, carbon dioxide, ammonia, helium, and argon or a gas mixture of two or more thereof.

7. The method for manufacturing the all-solid state secondary battery according to claim 6,
wherein the plasma is low-temperature atmospheric pressure plasma.

8. A solid electrolyte composition for an all-solid state secondary battery which is used for the all-solid state secondary battery according to claim 1, the solid electrolyte composition comprising:
sulfide-based inorganic solid electrolyte particles having conductivity for ions of metals belonging to Group I or II of the periodic table; and
non-oxide-based electrode active material particles,
wherein a proportion of an oxygen element in an element composition of a surface of at least one kind of the sulfide-based inorganic solid electrolyte particles or the non-oxide-based electrode active material particles is 3.0 atm % or more, and from said surface, one or more Raman spectral spectrum peaks are detected in at least one range of
2,800 $cm^{-1}$ to 3,700 $com^{-1}$,
1,600 $cm^{-1}$ to 1,800 $cm^{-1}$, or
1,020 $cm^{-1}$ to 1,250 $cm^{-1}$.

9. A method for manufacturing the solid electrolyte composition for an all-solid state secondary battery according to claim 8, comprising:
a step of setting the proportion of the oxygen element in the element composition of the particle surface to 3.0 atm % or more by an actinic ray or firing.

10. An electrode sheet for an all-solid state secondary battery which is used for the all-solid state secondary battery according to claim 1, the electrode sheet comprising:
sulfide-based inorganic solid electrolyte particles having conductivity for ions of metals belonging to Group I or II of the periodic table; and
non-oxide-based electrode active material particles,
wherein a proportion of an oxygen element in an element composition of a surface of at least one kind of the sulfide-based inorganic solid electrolyte particles or the non-oxide-based electrode active material particles is 3.0 atm % or more, and from said surface, one or more Raman spectral spectrum peaks are detected in at least one range of
2,800 cm$^{-1}$ to 3,700 com$^{-1}$,
1,600 cm$^{-1}$ to 1,800 cm$^{-1}$, or
1,020 cm$^{-1}$ to 1,250 cm$^{-1}$.

11. A method for manufacturing the electrode sheet for an all-solid state secondary battery according to claim 10, comprising:
Steps [1] and [2] below in this order:
[1] a step of applying a solid electrolyte composition containing sulfide-based inorganic solid electrolyte particles having conductivity for ions of metals belonging to Group I or II of the periodic table and non-oxide-based electrode active material particles, and
[2] a step of setting the proportion of the oxygen element in the element composition of the particle surface to 3.0 atm % or more by irradiating the solid electrolyte composition with an actinic ray.

12. An all-solid state secondary battery comprising:
sulfide-based inorganic solid electrolyte particles having conductivity for ions of metals belonging to Group I or II of the periodic table;
non-oxide-based electrode active material particles; and auxiliary conductive agent particles,
wherein a proportion of an oxygen element in an element composition of a surface of at least one kind of the sulfide-based inorganic solid electrolyte particles, the non-oxide-based electrode active material particles, or the auxiliary conductive agent particles is 3.0 atm % or more, and from said surface, one or more Raman spectral spectrum peaks are detected in at least one range of
2,800 cm$^{-1}$ to 3,700 com$^{-1}$,
1,600 cm$^{-1}$ to 1,800 cm$^{-1}$, or
1,020 cm$^{-1}$ to 1,250 cm$^{-1}$.

13. The all-solid state secondary battery according to claim 12,
wherein at least one kind of the non-oxide-based electrode active material particles or the auxiliary conductive agent particles are particles of a carbonaceous material in which the proportion of the oxygen element in the element composition of a surface is 3.0 atm % or more.

14. A solid electrolyte composition for an all-solid state secondary battery which is used for the all-solid state secondary battery according to claim 12, the solid electrolyte composition comprising:
sulfide-based inorganic solid electrolyte particles having conductivity for ions of metals belonging to Group I or II of the periodic table;
non-oxide-based electrode active material particles; and auxiliary conductive agent particles,
wherein a proportion of an oxygen element in an element composition of a surface of at least one kind of the sulfide-based inorganic solid electrolyte particles, the non-oxide-based electrode active material particles, or the auxiliary conductive agent particles is 3.0 atm % or more, and from said surface, one or more Raman spectral spectrum peaks are detected in at least one range of
2,800 cm$^{-1}$ to 3,700 com$^{-1}$,
1,600 cm$^{-1}$ to 1,800 cm$^{-1}$, or
1,020 cm$^{-1}$ to 1,250 cm$^{-1}$.

15. An electrode sheet for an all-solid state secondary battery which is used for the all-solid state secondary battery according to claim 12, the electrode sheet comprising:
sulfide-based inorganic solid electrolyte particles having conductivity for ions of metals belonging to Group I or II of the periodic table;
non-oxide-based electrode active material particles; and auxiliary conductive agent particles,
wherein a proportion of an oxygen element in an element composition of a surface of at least one kind of the sulfide-based inorganic solid electrolyte particles, the non-oxide-based electrode active material particles, or the auxiliary conductive agent particles is 3.0 atm % or more, and from said surface, one or more Raman spectral spectrum peaks are detected in at least one range of
2,800 cm$^{-1}$ to 3,700 com$^{-1}$,
1,600 cm$^{-1}$ to 1,800 cm$^{-1}$, or
1,020 cm$^{-1}$ to 1,250 cm$^{-1}$.

16. A method for manufacturing the electrode sheet for an all-solid state secondary battery according to claim 15, comprising:
Steps [1] and [2] below in this order:
[1] a step of applying a solid electrolyte composition containing sulfide-based inorganic solid electrolyte particles having conductivity for ions of metals belonging to Group I or II of the periodic table, non-oxide-based electrode active material particles, and auxiliary conductive agent particles; and
[2] a step of setting the proportion of the oxygen atom in the element composition of the particle surface to 3.0 atm % or more by irradiating the solid electrolyte composition with an actinic ray.

17. Particles for an all-solid state secondary battery which are sulfide-based inorganic solid electrolyte particles having conductivity for ions of metals belonging to Group I or II of the periodic table and non-oxide-based electrode active material particles or auxiliary conductive agent particles,
wherein a proportion of an oxygen element in an element composition of a surface is 3.0 atm % or more, and from said surface, one or more Raman spectral spectrum peaks are detected in at least one range of
2,800 cm$^{-1}$ to 3,700 com$^{-1}$,
1,600 cm$^{-1}$ to 1,800 cm$^{-1}$, or
1,020 cm$^{-1}$ to 1,250 cm$^{-1}$.

18. A method for manufacturing the particles for an all-solid state secondary battery according to claim 17, comprising:
a step of setting the proportion of the oxygen element in the element composition of the particle surface to 3.0 atm % or more by an actinic ray.

\* \* \* \* \*